(12) United States Patent
Comment et al.

(10) Patent No.: US 12,555,690 B2
(45) Date of Patent: Feb. 17, 2026

(54) TREE-BASED MODEL FOR SELECTING TREATMENTS AND DETERMINING EXPECTED TREATMENT OUTCOMES

(71) Applicant: Foundation Medicine, Inc., Cambridge, MA (US)

(72) Inventors: Leah Comment, Cambridge, MA (US); Giovanni Parmigiani, Cambridge, MA (US)

(73) Assignee: Foundation Medicine, Inc., Boston, MA (US)

(*) Notice: Subject to any disclaimer, the term of this patent is extended or adjusted under 35 U.S.C. 154(b) by 290 days.

(21) Appl. No.: 18/039,921

(22) PCT Filed: Dec. 2, 2021

(86) PCT No.: PCT/US2021/061647
§ 371 (c)(1),
(2) Date: Jun. 1, 2023

(87) PCT Pub. No.: WO2022/120075
PCT Pub. Date: Jun. 9, 2022

(65) Prior Publication Data
US 2024/0062916 A1    Feb. 22, 2024

Related U.S. Application Data

(60) Provisional application No. 63/121,195, filed on Dec. 3, 2020.

(51) Int. Cl.
*G16H 70/20* (2018.01)
*C12Q 1/6855* (2018.01)
*G16B 20/00* (2019.01)

(52) U.S. Cl.
CPC ........... *G16H 70/20* (2018.01); *C12Q 1/6855* (2013.01); *G16B 20/00* (2019.02)

(58) Field of Classification Search
CPC ........ G16H 70/20; G16H 10/20; G16H 20/00; G16H 50/20; C12Q 1/6855; G16B 20/00;
(Continued)

(56) References Cited

U.S. PATENT DOCUMENTS

2009/0061422 A1* 3/2009 Linke ............... G16B 40/00
703/11
2011/0200998 A1 8/2011 Weichselbaum et al.
(Continued)

FOREIGN PATENT DOCUMENTS

WO WO-2012092426 A1 7/2012
WO WO-2020132144 A1 * 6/2020 ............... G06N 5/01
WO WO-2020236941 A1 11/2020

OTHER PUBLICATIONS

Ackerman CM, Myhrvold C, Thakku SG, Freije CA, Metsky HC, Yang DK, Ye SH, Boehm CK, Kosoko-Thoroddsen TF, Kehe J, Nguyen TG, Carter A, Kulesa A, Barnes JR, Dugan VG, Hung DT, Blainey PC, Sabeti PC. Massively multiplexed nucleic acid detection with Cas13. Nature. Jun. 2020;582(7811):277-282. (Year: 2020).*

(Continued)

*Primary Examiner* — Sun M Li
(74) *Attorney, Agent, or Firm* — MORRISON & FOERSTER LLP

(57) ABSTRACT

Methods and systems for determining an expected disease treatment outcome upon treating a subject, methods and devices for selecting a treatment option for the subject, and methods of treating a subject for a disease, are described herein. The method can include receiving a plurality of subject characteristics for the subject; accessing a tree-based model corresponding to a treatment option for the disease, wherein the tree-based model is generated based on a plurality of prior patient characteristics and an associated treatment outcome for the corresponding treatment option;

(Continued)

and determining from the plurality of subject characteristics and the tree-based model, an expected treatment outcome for the subject if the subject were treated with the corresponding treatment option.

19 Claims, 7 Drawing Sheets

(58) Field of Classification Search
CPC .............. G16B 40/20; G01N 2800/52; G01N 33/57484
See application file for complete search history.

(56) References Cited

U.S. PATENT DOCUMENTS

| | | | | |
|---|---|---|---|---|
| 2011/0307427 | A1* | 12/2011 | Linke ..................... | G16B 40/20 706/12 |
| 2014/0081898 | A1 | 3/2014 | Saigal et al. | |
| 2016/0362749 | A1* | 12/2016 | Stephan ............... | C12Q 1/6886 |
| 2019/0136327 | A1* | 5/2019 | Zhang .................. | C12Q 1/6886 |
| 2019/0277856 | A1* | 9/2019 | Beim ..................... | G16B 25/30 |
| 2020/0294668 | A1* | 9/2020 | Pellini .................... | G16H 20/10 |
| 2021/0249101 | A1* | 8/2021 | Jain ....................... | G06N 20/00 |

OTHER PUBLICATIONS

Anderson MW, Schrijver I. Next generation DNA sequencing and the future of genomic medicine. Genes (Basel). May 25, 2010;1(1): 38-69. doi: 10.3390/genes1010038. PMID: 24710010; PMCID: PMC3960862. (Year: 2010).*

Reagents and Methods for the Analysis of Circulating Microparticles an IP.com Prior Art Database Technical Disclosure Authors et. al.: Disclosed Without Attribution IP.com No. IPCOM000256716D IP.com Electronic Publication Date: Dec. 22, 2018 (Year: 2018).*

Zhao L, Deng L, Li G, Jin H, Cai J, Shang H, Li Y, Wu H, Xu W, Zeng L, Zhang R, Zhao H, Wu P, Zhou Z, Zheng J, Ezanno P, Yang AX, Yan Q, Deem MW, He J. Single molecule sequencing of the M13 virus genome without amplification. PLoS One. Dec. 18, 2017;12(12):e0188181. doi: 10.1371/journal.pone.0188181. (Year: 2017).*

Albers et al., (2011). "Dindel: accurate indel calls from short-read data," Genome Res., 21(6):961-973.

Albert et al., (2007). "Direct selection of human genomic loci by microarray hybridization," Nat. Methods, 4(11):903-905.

Ambion, (2011). "RecoverAll Total Nucleic Acid Isolation Protocol (Ambion, Cat. No. AM1975)," available online at <https://assets.thermofisher.com/TFS-Assets/LSG/manuals/1975MC.pdf>, 29 pages.

Athey et al., (2019). "Generalized random forests," Annals of Statistics, 47(2):1148-1178, 49 pages.

Batzoglou et al., (2002). "ARACHNE: A Whole-Genome Shotgun Assembler," Genome Res., 12:177-189.

Browning et al., (2009). "Simultaneous genotype calling and haplotype phasing improves genotype accuracy and reduces false-positive associations for genome-wide association studies," Am. J. Hum. Genet., 85(6):847-861.

Butler et al., (2008). "ALLPATHS: de novo assembly of whole-genome shotgun microreads," Genome Res., 18(5):810-820.

Chipman et al., (2010). "BART: Bayesian additive regression trees," Ann. Appl. Stat., 4(1):266-298.

Cronin et al., (2004). "Measurement of gene expression in archival paraffin-embedded tissues: development and performance of a 92-gene reverse transcriptase-polymerase chain reaction assay," Am J Pathol., 164(1):35-42.

Farrar, (2007). "Striped Smith-Waterman Speeds Database Searches Six Times Over Other SIMD Implementations," Bioinformatics, 23(2):156-161.

Goya et al., (2010). "SNVMix: predicting single nucleotide variants from next-generation sequencing of tumors," Bioinformatics, 26(6):730-736.

Hodges et al., (2007). "Genome-wide in situ exon capture for selective resequencing," Nat. Genet., 39(12):1522-1527.

International Search Report and Written Opinion received for International Patent Application No. PCT/US2021/061647 mailed on Feb. 25, 2022, 17 pages.

Le et al., (2011). "SNP detection and genotyping from low-coverage sequencing data on multiple diploid samples," Genome Res., 21(6):952-960.

Li et al. (2009). "Fast and Accurate Short Read Alignment with Burrows-Wheeler Transform," Bioinformatics, 25:1754-60.

Li et al. (2010). "Fast and Accurate Long-Read Alignment with Burrows-Wheeler Transform," Bioinformatics, epub. PMID: 20080505.

Li et al., (2009). "Genotype imputation," Annu. Rev. Genomics Hum. Genet., 10:387-406.

Li et al., (2009). "The Sequence Alignment/Map format and SAMtools," Bioinformatics, 25(16):2078-2079.

Li et al., (2010). "Fast and accurate long-read alignment with Burrows-Wheeler transform," Bioinformatics, 26(5):589-595.

Lunter et al., (2011). "Stampy: a statistical algorithm for sensitive and fast mapping of Illumina sequence reads," Genome Res., 21(6):936-939.

Masuda et al., (1999). "Analysis of chemical modification of RNA from formalin-fixed samples and optimization of molecular biology applications for such samples," Nucleic Acids Res., 27(22):4436-4443.

Mckenna et al., (2010). "The Genome Analysis Toolkit: a MapReduce framework for analyzing next-generation DNA sequencing data," Genome Res., 20(9):1297-1303.

Metzker (2010). "Sequencing technologies—the next generation," Nat Rev Genet., 11(1):31-46.

Needleman et al., (1970). "A General Method Applicable to the Search for Similarities in the Amino Acid Sequence of Two Proteins," J. Molecular Biology, 48(3):443-53.

Okou et al., (2007). "Microarray-based genomic selection for high-throughput resequencing," Nat. Methods, 4(11):907-9.

OMEGA bio-tek, (2009). "E.Z.N.A.® FFPE DNA Kit Quick Guide, product Nos. D3399-00, and D3399-01," Available online at <https://www.omegabiotek.com/wp-content/uploads/2018/01/D3399-WEB.pdf>, 2 pages.

Promega, (2007). "Maxwell® 16 Cell Total RNA Purification Kit Technical Bulletin (Promega Literature #TB351)," available online at <http://www.yph-bio.com/equip/app/maxwell/maxwell_16_total_rna_purification_kit.pdf>, 25 pages.

Promega, (2017). "Maxwell® 16 LEV Blood DNA Kit and Maxwell 16 Buccal Swab LEV DNA Purification Kit Technical Manual (Promega Literature #TM333)," available online at <https://www.promega.com/-/media/files/resources/protocols/technical-manuals/101/maxwell-16-lev-blood-dna-kit-and-maxwell-16-buccal-swab-lev-dna-purification-kit-protocol.pdf?rev=f2833fb73dba4d8ab9601b5faa25c742&sc_lang=en>, 11 pages.

Qiagen, (2020). "QIAamp® DNA FFPE Tissue Handbook (Qiagen, Cat. No. 37625)," available online at <https://www.qiagen.com/nl/resources/download.aspx?id=7d3df4c2-b522-4f6d-b990-0ac3a71799b6&lang=en>, 28 pages.

Smith et al., (1981). "Identification of Common Molecular Subsequences," J. Molecular Biology, 147(1):195-197.

Specht et al., (2001). "Quantitative gene expression analysis in microdissected archival formalin-fixed and paraffin-embedded tumor tissue," Am J Pathol., 158(2):419-429.

Starling et al., (2019). "Targeted smooth Bayesian causal forests: An analysis of heterogeneous treatment effects for simultaneous versus interval medical abortion regimens over gestation," arXiv:1905.09405, 28 pages.

Starling et al., (2020). "BART with targeted smoothing: An analysis of patient-specific stillbirth risk," The Annals of Applied Statistics, 14:28-50, 26 pages.

Tan et al., (2009). "DNA, RNA, and Protein Extraction: The Past and The Present," J. Biomed. Biotech., 2009:574398, 10 pages.

Trapnell et al., (2009). "How to map billions of short reads onto genomes," Nature Biotech., 27(5):455-457.

Van Dijk et al., (2014). "Library preparation methods for next-generation sequencing: tone down the bias," Exp. Cell Research, 322:12-20.

(56) References Cited

OTHER PUBLICATIONS

Warren et al., (2007). "Assembling millions of short DNA sequences using SSAKE," Bioinformatics, 23(4):500-501.
Ye et al., (2009). "Pindel: a pattern growth approach to detect break points of large deletions and medium sized insertions from paired-end short reads," Bioinformatics, 25(21):2865-2871.
Zerbino et al., (2008). "Velvet: algorithms for de novo short read assembly using de Bruijn graphs," Genome Res., 18(5):821-829.
Sparapani et al., (2016). "Nonparametric survival analysis using Bayesian Additive Regression Trees (BART)," Statist Med, 35:2741-2753.
Foundation Medicine, Inc., (Dec. 4, 2020). "Decision Insights at Foundation Medicine," 40 pages.
Doubleday et al. (2018). "An Algorithm for Generating Individualized Treatment Decision Trees and Random Forests," J Comput Graph Stat, 2018;27(4):849-860.
Laber et al. (2015). "Tree-based methods for individualized treatment regimes," Biometrika, 102(3):501-514.

* cited by examiner

Identifying prognostic and predictive factors using Real-World Data (RWD)

Adaptive neighborhood weighting with Bayesian additive regression trees (BART)

Fit ensemble of $M$ regression trees to RWD $$\mathbb{E}[Y_z|\mathbf{X}] = \text{true } f_z^*(\mathbf{x}) \approx f_z(\mathbf{x}) = \sum_{m=1}^{M} g_{m,z}(\mathbf{x})$$

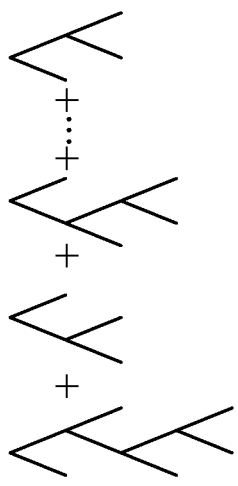

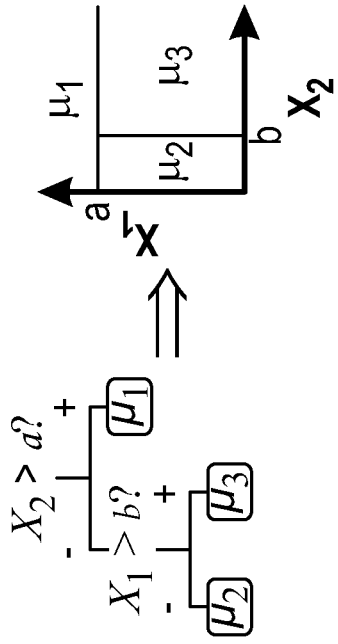

$g(x_1, x_2) = \mathbb{1}(x_1 > a)\, \mu_1 +$
$\mathbb{1}(x_1 \leq a)\mathbb{1}(x_2 \leq b)\, \mu_2 +$
$\mathbb{1}(x_1 \leq a)\, \mathbb{1}(x_2 > b)\, \mu_3$ Important prognostic and predictive factors will appear more often in tree splitting criteria Defines relevant "neighborhoods" for index patient with characteristics $\mathbf{x}^*$

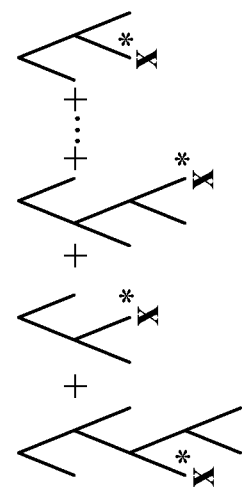

*FIG. 1*

Using RWD-derived neighborhoods to reanalyze Clinical Trial (RCT) data

*Inflating meta-analytic uncertainty for personalized effects*

$L_{z,m}^{(b)}(\mathbf{x}^*)$ is set of RCT patients on $z$ falling into same leaf as index patient in $b^{th}$ MCMC draw of tree $m$ for treatment $z$.

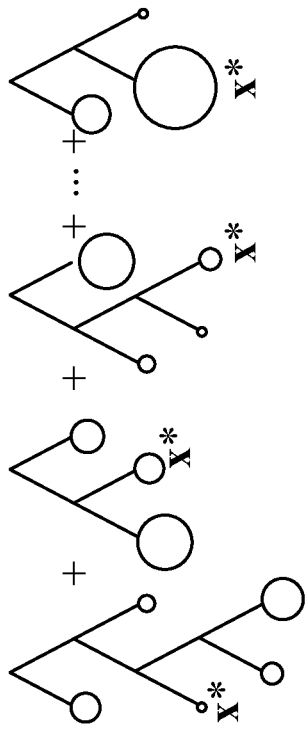

Weight for RCT patient $i$:

$$\alpha_{z,i}^{(b)}(\mathbf{x}^*) = \frac{1}{M}\sum_{m=1}^{M}\alpha_{z,mi}^{(b)}(\mathbf{x}^*) \text{ with } \alpha_{z,mi}^{(b)} = \frac{\mathbb{1}(\mathbf{X}_i \in L_{z,m}^{(b)}(\mathbf{x}^*))}{|L_{z,m}^{(b)}(\mathbf{x}^*)|}$$

Trial patients $\mathbf{X} = \mathbf{x}^*$ with get maximally weighted for estimating the expected treatment outcome

*FIG. 2B*

TREE-BASED MODEL FOR SELECTING TREATMENTS AND DETERMINING EXPECTED TREATMENT OUTCOMES

CROSS-REFERENCE TO RELATED APPLICATIONS

This application is a national stage application under 35 U.S.C. § 371 of International Application No. PCT/US2021/061647, filed internationally on Dec. 22, 2021, which claims the priority benefit of U.S. Provisional Application No. 63/121,195, filed Dec. 3, 2020, the disclosure of each of which is hereby incorporated by reference in its entirety.

FIELD OF THE INVENTION

Described herein are methods and devices for determining an expected disease treatment outcome upon treating a subject, methods and devices for selecting a treatment option for the subject, and methods of treating a subject for a disease.

BACKGROUND

The highest quality evidence about a drug's effectiveness often comes from clinical trials, which provide numerical summaries of effects averaged over the trial-eligible population. The patient population enrolled in a clinical trial is usually narrower than the intended use population, which may differ in disease prognosis, treatment location, or other factors related to trial selection criteria. It can therefore be difficult to predict how a patient outside of the clinical trial study group with respond to a given treatment, particularly when the clinical trial does not stratify patients or include patients with the total profile of a given intent to treat patient. When a doctor is trying to make a treatment decision for an individual patient, the effect for that particular patient is more meaningful than the average effect for a clinical trial population. That is, a treating healthcare provider wants to know how a particular patient will respond to a treatment regardless of clinical trial outcome for a selected patient population.

Doctors often have two or more treatment options for treating a patient, but must determine which of these treatment options will be most effective for treating a particular patient, even if that treatment option is less effective when used to treat a clinical trial patient population.

BRIEF SUMMARY OF THE INVENTION

Described herein are methods and systems for selecting a treatment for a subject having a disease, methods for determining an expected treatment outcome upon administering a treatment option to a patient, and devices for implementing these methods. Also described are methods of and systems for treating a patient using a treatment selected by a described method.

The methods can include the use of a one or more regression models (e.g., tree-based models, such as Bayesian additive regression tree models or other tree-based regression models), which each of which can determine an expected treatment outcome for the patient if the patient were treated with a treatment option corresponding with the model. Each decision tree model can be trained based on a plurality of prior patient characteristics and an associated treatment outcome (e.g., a patient treatment outcome) associated with those characteristics. The prior patients may be, for example, patients that participated in a clinical trial, or may be real-world patients (i.e., patients for which the treatment outcome was determined outside of a clinical trial).

In some instances, the method can include providing a plurality of nucleic acid molecules obtained from a sample from a subject having a disease; ligating one or more adapters onto one or more nucleic acid molecules from the plurality of nucleic acid molecules; amplifying the one or more ligated nucleic acid molecules from the plurality of nucleic acid molecules; capturing amplified nucleic acid molecules from the amplified nucleic acid molecules; sequencing, by a sequencer, the captured nucleic acid molecules to obtain a plurality of sequence reads that represent the captured nucleic acid molecules; generating, by one or more processors, a genomic profile including sequence read analysis data based on the sequence reads; identifying, using the one or more processors, a subject characteristic comprising a biomarker value for one or more gene loci based on the sequence read analysis data; receiving, at one or more processors, a plurality of additional subject characteristics for the subject; accessing, using the one or more processors, a tree-based model corresponding to a treatment option for the disease, wherein the tree-based model is generated based on a plurality of prior patient characteristics and an associated treatment outcome for the corresponding treatment option; and determining, using the one or more processors, from the plurality of subject characteristics and the tree-based model, an expected treatment outcome for the subject provided that the subject is treated with the corresponding treatment option.

In some implementations, the method includes: receiving, at one or more processors, a plurality of sequence reads associated with a sample from a subject; analyzing, using the one or more processors, the plurality of sequence reads to generate a genomic profile including sequence read analysis data; identifying, using the one or more processors, a subject characteristic comprising a biomarker value for one or more gene loci based on the sequence read analysis data; receiving, at one or more processors, a plurality of additional subject characteristics for the subject; accessing, using the one or more processors, a tree-based model corresponding to a treatment option for the disease, wherein the tree-based model is generated based on a plurality of prior patient characteristics and an associated treatment outcome for the corresponding treatment option; and determining, using the one or more processors, from the plurality of subject characteristics and the tree-based model, an expected treatment outcome for the subject provided that the subject is treated with the corresponding treatment option.

In some instances, determining the expected treatment outcome comprises weight a plurality of nodes in each tree-based model based on commonality between the plurality of subject characteristics and the plurality of prior patient characteristics.

In some instances, each tree-based model is a tree-based regression model. In some instances, each tree-based model is an ensemble tree model. In some instances, each tree-based model is a Bayesian additive regression tree model.

In some instances, the treatment outcomes for at least a first portion of the plurality of prior patients were determined during one or more clinical trials.

In some instances, the treatment outcome and the expected treatment outcome is for an overall survival time, a progression free survival time, a tumor response, a change in ctDNA level in the subject, disease remission, or a resistance to treatment.

In some instances, the plurality of subject characteristics comprises one or more of age, sex, race, year of cancer diagnosis, time since cancer diagnosis, time since diagnosis of metastatic disease, a biomarker value, a comorbidity, a list of prior therapies, a baseline ctDNA value, a practice setting, or a performance status; the plurality of prior patient characteristics comprises one or more of age, sex, race, year of cancer diagnosis, time since cancer diagnosis, time since diagnosis of metastatic disease, a biomarker value, a comorbidity, a list of prior therapies, a baseline ctDNA value, a practice setting, or a performance status; and at least a portion of the plurality of subject characteristics are the same type of characteristics as at least a portion of the plurality of prior patient characteristics for at least a portion of the prior patients.

In some instances, the biomarker value for the plurality of subject characteristics and the plurality of patient characteristics is a EGFR variant status, a NTRK variant status, a RET variant status, an ALK rearrangement variant status, a tumor mutational burden (TMB), HLA loss of heterozygosity (LOH) status, a germline status of a variant; a somatic status of a variant, a microsatellite instability (MSI) status, a homologous recombination deficiency (HRD) status, a genome-wide loss of heterozygosity (gLOH) status, a copy number alteration (CNA) status, a PD-L1 expression level status, a hormone receptor status, PSA expression level status, or a rate of PSA expression level increase.

In some instances, the disease is cancer. For example, the cancer may be a B cell cancer (multiple myeloma), a melanoma, breast cancer, lung cancer, bronchus cancer, colorectal cancer, prostate cancer, pancreatic cancer, stomach cancer, ovarian cancer, urinary bladder cancer, brain cancer, central nervous system cancer, peripheral nervous system cancer, esophageal cancer, cervical cancer, uterine cancer, endometrial cancer, cancer of an oral cavity, cancer of a pharynx, liver cancer, kidney cancer, testicular cancer, biliary tract cancer, small bowel cancer, appendix cancer, salivary gland cancer, thyroid gland cancer, adrenal gland cancer, osteosarcoma, chondrosarcoma, a cancer of hematological tissue, an adenocarcinoma, an inflammatory myofibroblastic tumor, a gastrointestinal stromal tumor (GIST), colon cancer, multiple myeloma (MM), myelodysplastic syndrome (MDS), myeloproliferative disorder (MPD), acute lymphocytic leukemia (ALL), acute myelocytic leukemia (AML), chronic myelocytic leukemia (CML), chronic lymphocytic leukemia (CLL), polycythemia Vera, Hodgkin lymphoma, non-Hodgkin lymphoma (NHL), soft-tissue sarcoma, fibrosarcoma, myxosarcoma, liposarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, squamous cell carcinoma, basal cell carcinoma, adenocarcinoma, sweat gland carcinoma, sebaceous gland carcinoma, papillary carcinoma, papillary adenocarcinomas, medullary carcinoma, bronchogenic carcinoma, renal cell carcinoma, hepatoma, bile duct carcinoma, choriocarcinoma, seminoma, embryonal carcinoma, Wilms' tumor, bladder carcinoma, epithelial carcinoma, glioma, astrocytoma, medulloblastoma, craniopharyngioma, ependymoma, pinealoma, hemangioblastoma, acoustic neuroma, oligodendroglioma, meningioma, neuroblastoma, retinoblastoma, follicular lymphoma, diffuse large B-cell lymphoma, mantle cell lymphoma, hepatocellular carcinoma, thyroid cancer, gastric cancer, head and neck cancer, small cell cancer, essential thrombocythemia, agnogenic myeloid metaplasia, hypereosinophilic syndrome, systemic mastocytosis, familiar hypereosinophilia, chronic eosinophilic leukemia, neuroendocrine cancers, or a carcinoid tumor.

In some instances, the method further comprises obtaining the sample from the subject. In some instances, the sample comprises a tissue biopsy sample, a liquid biopsy sample, or a normal control. In some instances, the sample is a liquid biopsy sample and comprises blood, plasma, cerebrospinal fluid, sputum, stool, urine, or saliva. In some instances, the sample is a liquid biopsy sample and comprises circulating tumor cells (CTCs). In some instances, the sample is a liquid biopsy sample and comprises cell-free DNA (cfDNA), circulating tumor DNA (ctDNA), or any combination thereof. In some instances, the plurality of nucleic acid molecules comprises a mixture of tumor nucleic acid molecules and non-tumor nucleic acid molecules. In some instances, the tumor nucleic acid molecules are derived from a tumor portion of a heterogeneous tissue biopsy sample, and the non-tumor nucleic acid molecules are derived from a normal portion of the heterogeneous tissue biopsy sample.

In some instances, the sample comprises a liquid biopsy sample, and wherein the tumor nucleic acid molecules are derived from a circulating tumor DNA (ctDNA) fraction of the liquid biopsy sample, and the non-tumor nucleic acid molecules are derived from a non-tumor, cell-free DNA (cfDNA) fraction of the liquid biopsy sample.

In some instances, the one or more adapters comprise amplification primers, flow cell adaptor sequences, substrate adapter sequences, or sample index sequences.

In some instances, the captured nucleic acid molecules are captured from the amplified nucleic acid molecules by hybridization to one or more bait molecules. In some instances, the one or more bait molecules comprise one or more nucleic acid molecules, each comprising a region that is complementary to a region of a captured nucleic acid molecule.

In some instances, amplifying nucleic acid molecules comprises performing a polymerase chain reaction (PCR) amplification technique, a non-PCR amplification technique, or an isothermal amplification technique.

In some instances, the sequencing comprises use of a massively parallel sequencing (MPS) technique, whole genome sequencing (WGS), whole exome sequencing, targeted sequencing, direct sequencing, or Sanger sequencing technique. In some instances, the sequencing comprises massively parallel sequencing, and the massively parallel sequencing technique comprises next generation sequencing (NGS).

In some instances, the sequencer comprises a next generation sequencer.

In some instances, one or more of the plurality of sequencing reads overlap one or more gene loci within one or more subgenomic intervals within the sample.

In some instances, the method further includes generating a report comprising a list of expected treatment outcomes for the subject if the subject were treated with corresponding treatment options. In some instances, the method includes transmitting the report to a healthcare provider. In some instances, the report is transmitted via a computer network or a peer-to-peer connection.

A method (which may be a computer-implemented method) of determining an expected treatment outcome for a subject having a disease (such as cancer) may include: receiving, at one or more processors, a plurality of subject characteristics for the subject; accessing, using the one or more processors, a tree-based model (e.g., a tree based regression model, such as an ensemble regression tree model), which may be stored on a memory configured to be accessed by the one or more processor, corresponding to a treatment option for the disease, wherein the tree-based model is generated based on a plurality of prior patient characteristics and an associated treatment outcome for the corresponding treatment option; and determining, using the one or more processors, from the plurality of subject characteristics and the tree-based model, an expected treatment outcome for the subject provided that the subject is treated with the corresponding treatment option. The plurality of prior patient characteristics and associated treatment outcome may be determined during a clinical trial or outside of a clinical trial (i.e., real-world data), or both. For example, the tree-based model may be fit using the real-world data and nodes of the tree-based model may be weighted or determined using clinical trial data. In some embodiments, tree-based model is a Bayesian additive regression tree model.

A method (which may be a computer-implemented method) of determining an expected treatment outcome (for example, or two treatment options, or three or more treatment options) for a subject having a disease (such as cancer) may include: receiving, at one or more processors, a plurality of subject characteristics for the subject; accessing, using the one or more processors, two or more tree-based models (e.g., a tree based regression models, such as an ensemble regression tree models), which may be stored on a memory configured to be accessed by the one or more processor, wherein each tree-based model corresponds to a treatment option for the disease, and wherein each tree-based model is generated based on a plurality of prior patient characteristics and an associated treatment outcome for the corresponding treatment option; and determining, using the one or more processors, from the plurality of subject characteristics and the two or more tree-based models, an expected treatment outcome for the subject provided that the subject is treated with the corresponding treatment option. The plurality of prior patient characteristics and associated treatment outcome may be determined during a clinical trial or outside of a clinical trial (i.e., real-world data), or both. For example, the tree-based model may be fit using the real-world data and nodes of the tree-based model may be weighted or determined using clinical trial data. In some embodiments, tree-based model is a Bayesian additive regression tree model.

A method of selecting a treatment (for example, a treatment selected from two treatment options, or three or more treatment options) for a subject having a disease (such as cancer) may include receiving, at one or more processors, a plurality of subject characteristics for the subject; accessing, using the one or more processors, two or more tree-based models (e.g., a tree based regression models, such as an ensemble regression tree models), which may be stored on a memory configured to be accessed by the one or more processor, wherein each tree-based model corresponds to a treatment option for the disease, and wherein each tree-based model is generated based on a plurality of prior patient characteristics and an associated treatment outcome for the corresponding treatment option; determining, using the one or more processors, from the plurality of subject characteristics and the tree-based model, an expected treatment outcome for the subject provided that the subject is treated with the corresponding treatment option; and selecting, based on the expected treatment outcome of each treatment option, the treatment option most likely to be effective for treating the disease in the subject. The plurality of prior patient characteristics and associated treatment outcome may be determined during a clinical trial or outside of a clinical trial (i.e., real-world data), or both. For example, the tree-based model may be fit using the real-world data and nodes of the tree-based model may be weighted or determined using clinical trial data. In some embodiments, tree-based model is a Bayesian additive regression tree model.

In some embodiments, determining the expected treatment outcome comprises weighting a plurality of nodes in each tree-based model based on commonality between the plurality of subject characteristics and the plurality of prior patient characteristics.

Uncertainty in the tree-based models is accounted for using a Markov chain Monte Carlo process, a bagging processes, or a non-Bayesian model. In some embodiments, uncertainty in the tree-based models is accounted for using a Markov chain Monte Carlo process.

The treatment outcome and/or the expected treatment outcome may be, for example, an overall survival time, a progression free survival time, a tumor response, a change in ctDNA level in the subject, disease remission, or a resistance to treatment.

For example, the expected treatment outcome may be a distribution of expected treatment outcome likelihoods such as a distribution of expected treatment outcome likelihoods for a plurality of time periods.

In some embodiments, the disease is a cancer, muscular sclerosis, or end-stage renal disease. In some embodiments, the disease is cancer. In some embodiments, the treatment option or treatment options comprise an immuno-oncology treatment option or a chemotherapy treatment option, or both.

The plurality of subject characteristics may include one or more of age, sex, race, year of cancer diagnosis, time since cancer diagnosis, time since diagnosis of metastatic disease, a biomarker value, a comorbidity, a list of prior therapies, a baseline ctDNA value, a practice setting, or a performance status. The plurality of prior patient characteristics may include one or more of age, sex, race, year of cancer diagnosis, time since cancer diagnosis, time since diagnosis of metastatic disease, a biomarker value, a comorbidity (e.g., diabetes or heart disease), a list of prior therapies (optionally including a list of time spent on each prior therapy), a baseline ctDNA value, a practice setting (for example, classified as an academic setting or a community setting), or a performance status. At least a portion of the plurality of subject characteristics may be the same type of characteristics as at least a portion of the plurality of prior patient characteristics for at least a portion of the prior patients. Exemplary biomarker values may include a EGFR variant status, a NTRK variant status, a RET variant status, an ALK rearrangement variant status, a tumor mutational burden (TMB), HLA loss of heterozygosity (LOH) status, a germline status of a variant, a somatic status of a variant, a microsatellite instability (MSI) status, a homologous recombination deficiency (HRD) status, a genome-wide loss of heterozygosity (gLOH) status, a copy number alteration (CAN) status, a PDL1 expression level status, a hormone receptor status, PSA expression level status, or a rate of PSA expression level increase.

The method of any of the above my further include displaying, on an electronic display: the treatment option most likely to be effective for treating the disease in the subject, or the expected treatment outcome for one or more treatment options.

The method of any of the above my further include reporting, to the subject or a healthcare provider for the subject, a report (which may be an electronic report or a non-electronic report) indicating: the treatment option most likely to be effective for treating the disease in the subject, or the expected treatment outcome for one or more treatment options.

Also described herein is a system (e.g., one or more electronic devices) that includes one or more processors; and a memory storing one or more programs configured to be executed by the one or more processors the one or more programs including instructions for implementing any of the above methods.

For example, the system may include one or more processors; and a memory storing one or more programs configured to be executed by the one or more processors the one or more programs including instructions for determining an expected treatment outcome for a subject having a disease (such as cancer), which may include: receiving, at one or more processors, a plurality of subject characteristics for the subject; accessing, using the one or more processors, a tree-based model (e.g., a tree based regression model, such as an ensemble regression tree model), which may be stored on the memory, corresponding to a treatment option for the disease, wherein the tree-based model is generated based on a plurality of prior patient characteristics and an associated treatment outcome for the corresponding treatment option; and determining, using the one or more processors, from the plurality of subject characteristics and the tree-based model, an expected treatment outcome for the subject if the subject were treated with the corresponding treatment option. The plurality of prior patient characteristics and associated treatment outcome may be determined during a clinical trial or outside of a clinical trial (i.e., real-world data), or both. For example, the tree-based model may be fit using the real-world data and nodes of the tree-based model may be weighted or determined using clinical trial data. In some embodiments, tree-based model is a Bayesian additive regression tree model.

The system may include one or more processors; and a memory storing one or more programs configured to be executed by the one or more processors the one or more programs including instructions for determining an expected treatment outcome (for example, or two treatment options, or three or more treatment options) for a subject having a disease (such as cancer) may include: receiving, at one or more processors, a plurality of subject characteristics for the subject; accessing, using the one or more processors, two or more tree-based models (e.g., a tree based regression models, such as an ensemble regression tree models), which may be stored on the memory, wherein each tree-based model corresponds to a treatment option for the disease, and wherein each tree-based model is generated based on a plurality of prior patient characteristics and an associated treatment outcome for the corresponding treatment option; and determining, using the one or more processors, from the plurality of subject characteristics and the tree-based model, an expected treatment outcome for the subject if the subject were treated with the corresponding treatment option. The plurality of prior patient characteristics and associated treatment outcome may be determined during a clinical trial or outside of a clinical trial (i.e., real-world data), or both. For example, the tree-based model may be fit using the real-world data and nodes of the tree-based model may be weighted or determined using clinical trial data. In some embodiments, tree-based model is a Bayesian additive regression tree model.

The system may include one or more processors; and a memory storing one or more programs configured to be executed by the one or more processors the one or more programs including instructions for selecting a treatment (for example, a treatment selected from two treatment options, or three or more treatment options) for a subject having a disease (such as cancer) may include receiving, at one or more processors, a plurality of subject characteristics for the subject; accessing, using the one or more processors, two or more tree-based models (e.g., a tree based regression models, such as an ensemble regression tree models), which may be stored on the memory, wherein each tree-based model corresponds to a treatment option for the disease, and wherein each tree-based model is generated based on a plurality of prior patient characteristics and an associated treatment outcome for the corresponding treatment option; determining, using the one or more processors, from the plurality of subject characteristics and the tree-based model, an expected treatment outcome for the subject if the subject were treated with the corresponding treatment option; and selecting, based on the expected treatment outcome of each treatment option, the treatment option most likely to be effective for treating the disease in the subject. The plurality of prior patient characteristics and associated treatment outcome may be determined during a clinical trial or outside of a clinical trial (i.e., real-world data), or both. For example, the tree-based model may be fit using the real-world data and nodes of the tree-based model may be weighted or determined using clinical trial data. In some embodiments, tree-based model is a Bayesian additive regression tree model.

Also described herein is a method of treating a subject having a disease, which can include selecting a treatment for the subject according to any one of the above methods; and administering to the subject the treatment option most likely to be effective for treating the disease. For example, a method of treating the subject can include electing a treatment (for example, a treatment selected from two treatment options, or three or more treatment options) for a subject having a disease (such as cancer) may include receiving, at one or more processors, a plurality of subject characteristics for the subject; accessing, using the one or more processors, two or more tree-based models (e.g., a tree based regression models, such as an ensemble regression tree models), which may be stored on the memory, wherein each tree-based model corresponds to a treatment option for the disease, and wherein each tree-based model is generated based on a plurality of prior patient characteristics and an associated treatment outcome for the corresponding treatment option; determining, using the one or more processors, from the plurality of subject characteristics and the tree-based model, an expected treatment outcome for the subject if the subject were treated with the corresponding treatment option; selecting, based on the expected treatment outcome of each treatment option, the treatment option most likely to be effective for treating the disease in the subject; and administering to the subject the treatment option most likely to be effective for treating the disease. The plurality of prior patient characteristics and associated treatment outcome may be determined during a clinical trial or outside of a clinical trial (i.e., real-world data), or both. For example, the tree-based model may be fit using the real-world data and nodes of the tree-based model may be weighted or determined using clinical trial data. In some embodiments, tree-based model is a Bayesian additive regression tree model.

BRIEF DESCRIPTION OF THE DRAWINGS

FIG. 1 shows an exemplary method of fitting an ensemble tree regression model, according to some embodiments.

FIG. 2B shows an exemplary method of how the clinical trial data is used to weight the nodes, according to some embodiments.

DETAILED DESCRIPTION OF THE INVENTION

Figure 2A:
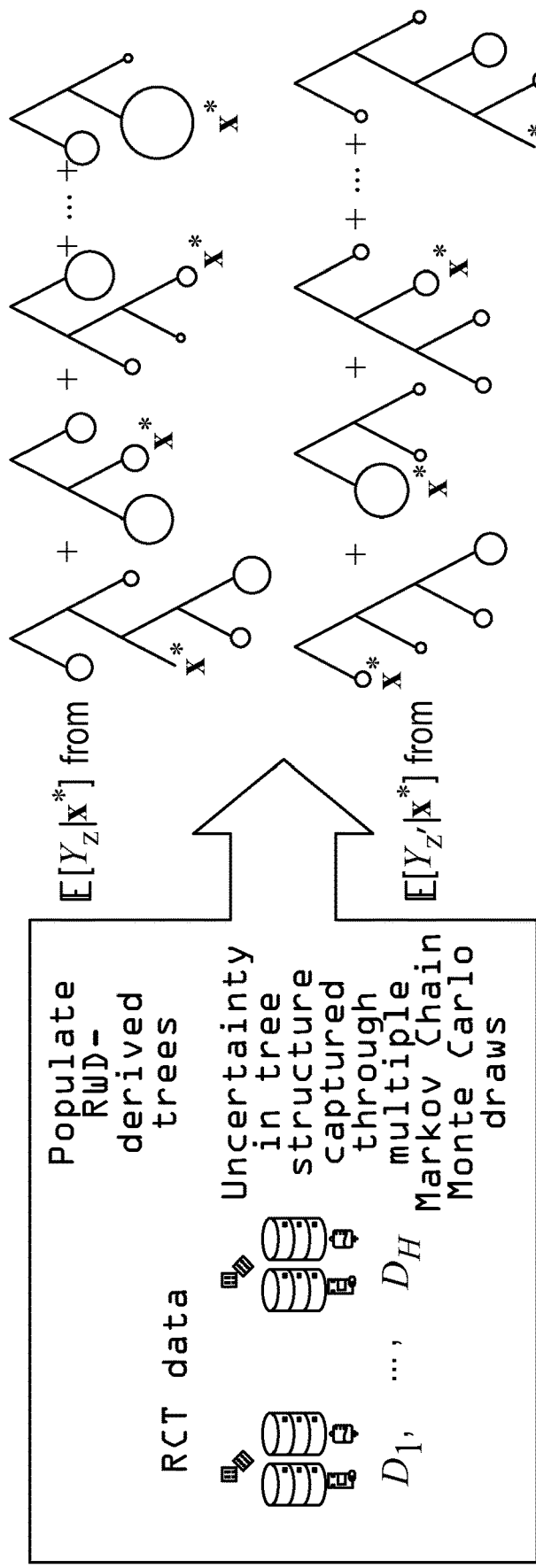
FIG. 2A shows an exemplary use of real-world data generated ensemble tree regression model used to analyze clinical trial data to populate the tree nodes, according to some embodiments.

The methods described herein can be useful for determining an expected treatment outcome for a subject having a disease, or for selecting a treatment option for treating the subject. For example, the subject may or a healthcare provider for the subject may be considering whether a treatment option is worth the risk of an adverse event or the cost of treatment, and informing the subject of the likelihood of success in treatment provides a significant advantage for effect treatment. In some situations, subject or healthcare provider for the subject may be deciding between two or more different treatment options to most effectively treat the disease. For example, simply because a clinical trial demonstrated that, across a studied clinical trial population, a first treatment option is more effective at treating the disease than a second treatment option does not indicate that, for the specific subject being treated, that the first treatment option is more likely to be effective than the second treatment option. The methods described herein can provide a personalized predication of one or more treatment options, and the subject or healthcare provider can select the optimal treatment option for the subject based on the characteristics of the subject.

The methods described herein are robust and may be used for numerous diseases. For example, the method may be used when the disease is cancer, muscular sclerosis, or end-stage renal disease. In some embodiments, the disease is cancer.

An exemplary computer-implemented method for determining an expected treatment outcome for a subject having a disease can include receiving, at one or more processors, a plurality of subject characteristics for the subject; accessing, using the one or more processors, a tree-based model corresponding to a treatment option for the disease, wherein the tree-based model is generated based on a plurality of prior patient characteristics and an associated treatment outcome for the corresponding treatment option; and determining, using the one or more processors, from the plurality of subject characteristics and the tree-based model, an expected treatment outcome for the patient if the patient were treated with the corresponding treatment option. This prediction method can be expanded to determine expected treatment outcomes for a plurality of different treatment options. For example, a computer-implemented method of determining an expected treatment outcome for a subject having a disease can include: receiving, at one or more processors, a plurality of subject characteristics for the subject; accessing, using the one or more processors, two or more tree-based models, wherein each tree-based model corresponds to a treatment option for the disease, and wherein each treebased model is generated based on a plurality of prior patient characteristics and an associated treatment outcome for the corresponding treatment option; and determining, using the one or more processors, from the plurality of subject characteristics and the tree-based model, an expected treatment outcome for the patient if the patient were treated with the corresponding treatment option.

Knowing the expected treatment outcomes or two or more different treatment options is useful for selecting the treatment outcome most likely to be effective for treating the disease in the subject. For example, a method of selecting a treatment for a subject having a disease can include determining an expected treatment outcome for the subject for two or more treatment options; and selecting, based on the expected treatment outcome of each treatment option, the treatment option most likely to be effective for treating the disease in the patient. The expected treatment outcome for the subject for the two or more treatment options can be determined using any of the methods described herein, for example by using a computer-implemented method that includes receiving, at one or more processors, a plurality of subject characteristics for the subject; accessing, using the one or more processors, two or more tree-based models, wherein each tree-based model corresponds to a treatment option for the disease, and wherein each treebased model is generated based on a plurality of prior patient characteristics and an associated treatment outcome for the corresponding treatment option; and determining, using the one or more processors, from the plurality of subject characteristics and the tree-based model, an expected treatment outcome for the patient if the patient were treated with the corresponding treatment option.

Once the treatment option has been selected for the patient, the patient can be treated for the disease by administering, to the patient, the treatment option.

Definitions

Unless otherwise defined, all of the technical terms used herein have the same meaning as commonly understood by one of ordinary skill in the art in the field to which this disclosure belongs.

As used herein, the singular forms "a," "an," and "the" include the plural reference unless the context clearly dictates otherwise. Any reference to "or" herein is intended to encompass "and/or" unless otherwise stated.

Reference to "about" a value or parameter herein includes (and describes) variations that are directed to that value or parameter per se. For example, description referring to "about X" includes description of "X".

The terms "individual," "patient," and "subject" are used synonymously, and refer to a mammal.

It is understood that aspects and variations of the invention described herein include "consisting" and/or "consisting essentially of" aspects and variations. As used herein, the terms "comprising" (and any form or variant of comprising, such as "comprise" and "comprises"), "having" (and any form or variant of having, such as "have" and "has"), "including" (and any form or variant of including, such as "includes" and "include"), or "containing" (and any form or variant of containing, such as "contains" and "contain"), are inclusive or open-ended and do not exclude additional, un-recited additives, components, integers, elements, or method steps.

As used herein, the term "subgenomic interval" (or "subgenomic sequence interval") refers to a portion of a genomic sequence.

As used herein, the term "subject interval" refers to a subgenomic interval or an expressed subgenomic interval (e.g., the transcribed sequence of a subgenomic interval).

As used herein, the terms "variant sequence" or "variant" are used interchangeably and refer to a modified nucleic acid sequence relative to a corresponding "normal" or "wild-type" sequence. In some instances, a variant sequence may be a "short variant sequence" (or "short variant"), i.e., a variant sequence of less than about 50 base pairs in length.

When a range of values is provided, it is to be understood that each intervening value between the upper and lower limit of that range, and any other stated or intervening value in that states range, is encompassed within the scope of the present disclosure. Where the stated range includes upper or lower limits, ranges excluding either of those included limits are also included in the present disclosure.

The section headings used herein are for organization purposes only and are not to be construed as limiting the subject matter described. The description is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein.

The figures illustrate processes according to various embodiments. In the exemplary processes, some blocks are, optionally, combined, the order of some blocks is, optionally, changed, and some blocks are, optionally, omitted. In some examples, additional steps may be performed in combination with the exemplary processes. Accordingly, the operations as illustrated (and described in greater detail below) are exemplary by nature and, as such, should not be viewed as limiting.

The disclosures of all publications, patents, and patent applications referred to herein are each hereby incorporated by reference in their entireties. To the extent that any reference incorporated by reference conflicts with the instant disclosure, the instant disclosure shall control.

Treatment Outcome Prediction Models

The methods described herein can used tree-based models and a plurality of subject characteristics for the subject to predict a treatment outcome (i.e., determine an expected treatment outcome for a corresponding treatment option) if a given patient having a disease were treated with the corresponding treatment option. Each of the tree-based model can correspond to a given treatment option, and a plurality of tree-based models can be used to compare expected treatment outcomes, for example to determine the treatment option most likely to be effective for treating the disease in the subject.

A tree-based model can be generated based on a plurality of prior patient characteristics and an associated treatment outcome for the corresponding treatment option. The plurality of prior patient characteristics do not need to be an exact match with the plurality of subject characteristics, although there is preferably some overlap between the sets of characteristics.

The tree-based model (or models) may be a tree-based regression model. In some embodiments, the tree-based model is an ensemble tree model (e.g., an ensemble tree-based regression model). For example, the tree-based model may be a Bayesian additive regression tree (BART) model. An exemplary Bayesian additive regression model is described Chipman et al., *BART: Bayesian additive regression trees*, Ann. Appl. Stat., vol. 4, no. 1, pp. 266-298 (2010). See also Athey et al., *Generalized random forests*, Annals of Statistics, vol. 47, no. 2, pp. 1148-1178 (2019).

Data for prior patients (e.g., the plurality of prior patient characteristics or a prior patient, along with a treatment outcome for a treatment option) is used to generate the tree-based model. In some embodiments, at least a portion of the data is determined during one or more (e.g., a plurality of) clinical trials (i.e., "clinical trial data"). If a plurality of clinical trials is used for the data, the clinical trials may have collected the same prior patient characteristics or different prior patient characteristics. In some embodiments, at least a portion of the data is determined outside of a clinical trial (i.e., "real-world data"). Data determined outside of a clinical trial may be stored on a database that associated prior patient characteristics, a treatment option, and treatment option. For example, a clinic-genomic database (CGDB) may be used, use as the Foundation-Flatiron clinico-genomic database. The set of prior patient characteristics determined during a clinical trial may be the same or different from the set of prior patient characteristics determined outside of a clinical trial, and may be at least partially overlapping.

The clinical trial data and the real world data may be used differently to generate the tree-based models. For example, the tree-based models may be fit using the real-world data, and nodes of the tree-based models may be determined using the clinical trial data. That is, the real-world data can be used to generate the tree structure, which is used analyze the clinical trial data to populate the nodes of the tree. As more real-world data is collected, the tree-based models can be re-determined using the additional real-world data. See FIG. 1, which illustrates an exemplary method of fitting an ensemble tree regression model. Uncertainty in a tree-based model may be accounted for, for example, using a Markov chain Monte Carlo process, a bagging processes, or a non-Bayesian model. In some embodiments, uncertainty in a tree-based model may be accounted for using a Markov chain Monte Carlo process. The nodes with the tree-based model may be weighted based on a commonality between the plurality of prior patient characteristics from real-world data and the plurality of prior patient characteristics from clinical trial data. For example, a node associated with prior patient characteristics from clinical trial data that are the same as the prior patient characteristics from real-world data will be more heavily weighted for estimating the expected treatment outcome, whereas a greater mismatch will be less-heavily weighted. See FIG. 2A and FIG. 2B, which demonstrate the use of real-world data generated ensemble tree regression model used to analyze clinical trial data to populate the tree nodes.

The generated tree-based model can then be used to predict how a subject with a set of subject characteristics will respond to a treatment option for the tree-based model. That is the tree-based model corresponding to a treatment option for the disease can be used to determine an expected treatment outcome for the subject if the subject were treated with the corresponding treatment option. In some embodiments, the expected treatment outcome for the subject is a weighted average of the treatment outcomes for prior patients (e.g., prior patients from a clinical trial). For example, the following can be used to determine posterior draws of the subject's personalized expected treatment outcome Y for treatment option z. In some embodiments, the weights are normalized:

$$\hat{F}[Y_z | x^*]^{(b)} = \frac{\sum_{i \in \mathcal{D}_1, \ldots, \mathcal{D}_H} Y_i \times \alpha_{z,i}^{(b)}(x^*)}{\sum_{i \in \mathcal{D}_1, \ldots, \mathcal{D}_H} \alpha_{z,i}^{(b)}(x^*)}$$

The type of treatment outcome used for the prior patients may be the same type of treatment outcome as the expected treatment outcome of the subject. Exemplary treatment outcomes (or expected treatment outcomes) may be an overall survival time, a progression free survival time, a tumor response, a change in ctDNA level in the subject, disease remission, or a resistance to treatment. Other treatment outcomes may also be considered. The determined expected treatment outcome may be distribution (e.g., a distribution of expected treatment outcome likelihoods). For example, the distribution may be expected treatment outcome likelihoods for a plurality of time periods. For example, the expected treatment outcome may provide an expected treatment outcome after a first time period and an expected treatment outcome after a second time period. Solely by way of example, the expected treatment outcome may provide a likelihood of survival after 6 months and a likelihood of survival after 5 years if the subject were to be treated with the corresponding treatment option.

In some embodiments, a tree-based model may incorporate a targeted smoothing based on a continuous measure, e.g., a time or a propensity score. An exemplary smoothing technique is described in Starling, Jennifer E., et al. "BART with targeted smoothing: An analysis of patient-specific stillbirth risk." *The Annals of Applied Statistics* 14.1 (2020): 28-50.) According to another example, a Bayesian causal forest model may incorporate the targeted smoothing technique. An exemplary smoothing technique used with a Bayesian causal forests is described in Starling, Jennifer E., et al. "Targeted smooth Bayesian causal forests: An analysis of heterogeneous treatment effects for simultaneous versus interval medical abortion regimens over gestation." *arXiv preprint arXiv*: 1905.09405 (2019).

The prior patient characteristics or subject characteristics may be any feature of the patient. Exemplary characteristics include, but are not limited to, one or more of age, sex, race, year of cancer diagnosis, time since cancer diagnosis, time since diagnosis of metastatic disease, a biomarker value, a comorbidity (for example, diabetes, or heart disease), a list of prior therapies (which may optionally further include a list of time spent on each prior therapy), a baseline ctDNA value (e.g., tumor fraction), a practice setting (e.g., a community setting or academic setting for treatment), or a performance status. Exemplary biomarker values may include, but are not limited to, a EGFR variant status, a NTRK variant status, a RET variant status, an ALK rearrangement variant status, a tumor mutational burden (TMB), HLA loss of heterozygosity (LOH) status, a germline status of a variant, a somatic status of a variant, a microsatellite instability (MSI) status, a homologous recombination deficiency (HRD) status, a genome-wide loss of heterozygosity (gLOH) status, a copy number alteration (CAN) status, a PDL1 expression level status, a hormone receptor status, PSA expression level status, or a rate of PSA expression level increase.

In some embodiments, prior patient data may be insufficient for determining (e.g., predicting outcomes) one or more treatment options using the tree-based model, e.g., when incoming subject predictions fall into a covariate space partition determined by the tree where prior patient data is insufficient. In this instance, data to be used in the tree-based model may be selected by: (1) populating based on a draw from a prior predictive distribution; (2) using data from prior models in which those patients had similar characteristics to the incoming subject (e.g., a prespecified or data-informed prior distribution); (3) pruning the tree in the tree-based model to create a coarser partition of the covariate space; or (4) remove the iteration from the calculation (e.g., omit that specific "b" draw from inclusion in the combined Markov chain Monte Carlo, or for tree-based ensembles, selectively remove offending trees from the ensemble); (5) return a negative or "no result" finding for that particular combination of covariate space partitions (e.g., elect not to return as a result for patient profiles where the empty nodes occur); (6) or a combination of one or more of these techniques.

Figure 3:
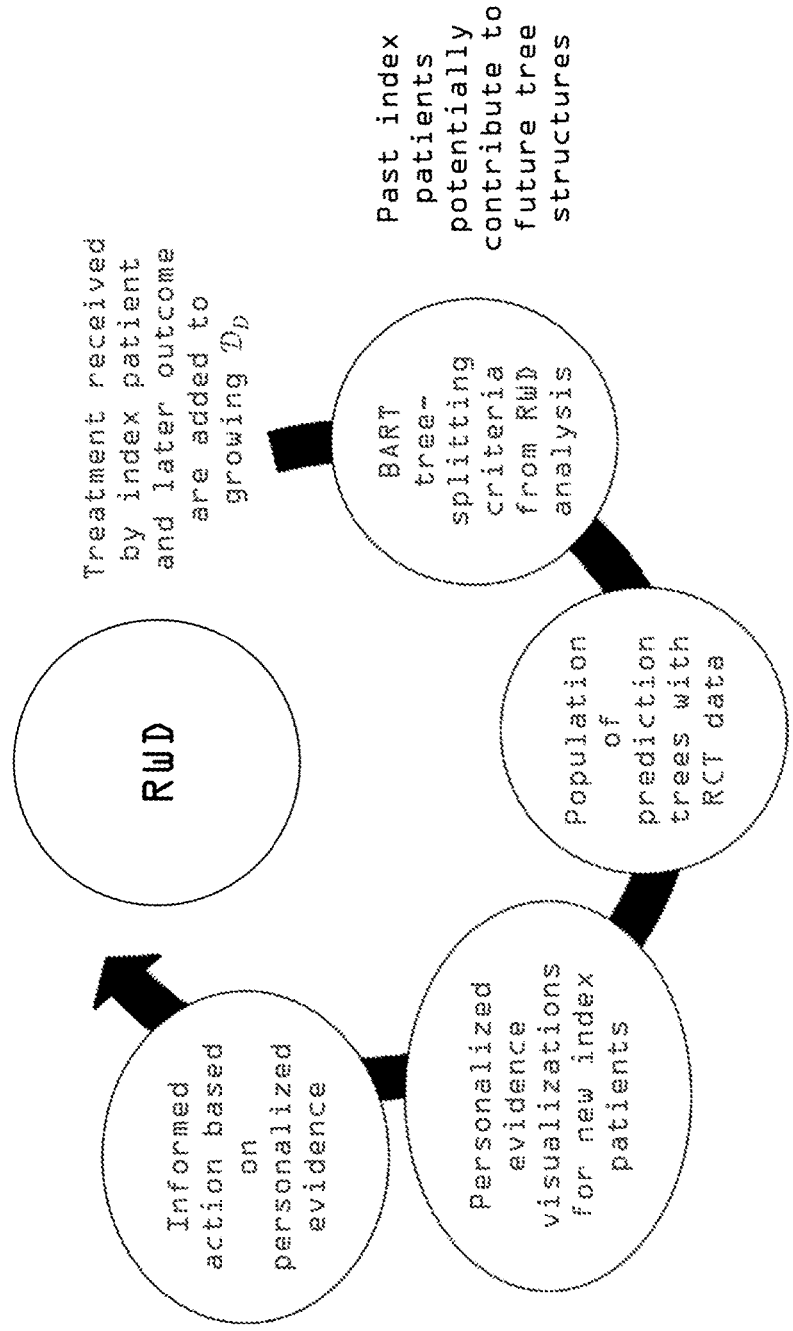
FIG. 3 shows learning loop that relies on real-world data to generate updated tree-based models, according to some embodiments.

The tree-based model can be updated as additional real world data becomes available, include updates using data from the treated subject. This can generate a learning loop, as illustrated in FIG. 3.

Treatment options (i.e., two or more) may be compared using a tree-based model corresponding to each treatment option. In some embodiments, two treatment option are compared. That is, an expected treatment outcome for the subject if the subject were treated with a corresponding treatment option may be determined for two treatment options. In some embodiments, three or more treatment options are compared. That is, an expected treatment outcome for the subject if the subject were treated with a corresponding treatment option may be determined for three or more treatment options. By way of example, treatment option z and treatment option z' may be compared according to:

$$\hat{\Delta}(x^*) = \sum_{b=1}^{B} \{\hat{F}[Y_z | x^*]^{(b)} - \hat{F}[Y_{z'} | x^*]^{(b)}\}$$

wherein x* indicated the plurality of subject characteristics for the subject, Y is the determined expected treatment outcome for the treatment option, and b indexes the representative draw (e.g., the number of thinned, combined Monte Carlo draws).

The treatment options evaluated using the methods described herein may be any therapeutic agent, surgical procedure, or any other medical or homeopathic intervention. The treatment options may depend on the disease type. For example, the method may be used to select between an immune-oncology treatment option, a chemotherapy treatment option, or a combination therapy (e.g., both immuno-oncology treatment and chemotherapy treatment option), for example to treat a subject with cancer.

The determined expected treatment outcome for one or more treatment options, or the treatment option most likely to be effective for treating the disease in the subject may be displayed (for example, using an electronic display as part of an electronic system) or reported (for example reported to the subject or to a healthcare provider for the subject). The report may be an electronic report (e.g., an electronic medical record), or a non-electronic report (e.g., a paper report, which may be, for example, stored in a paper record or delivered to the subject or healthcare provider for the subject). In some instances, all or a portion of the report may be displayed in the graphical user interface of an online or web-based healthcare portal. In some instances, the report is transmitted via a computer network or peer-to-peer connection.

Figure 4:
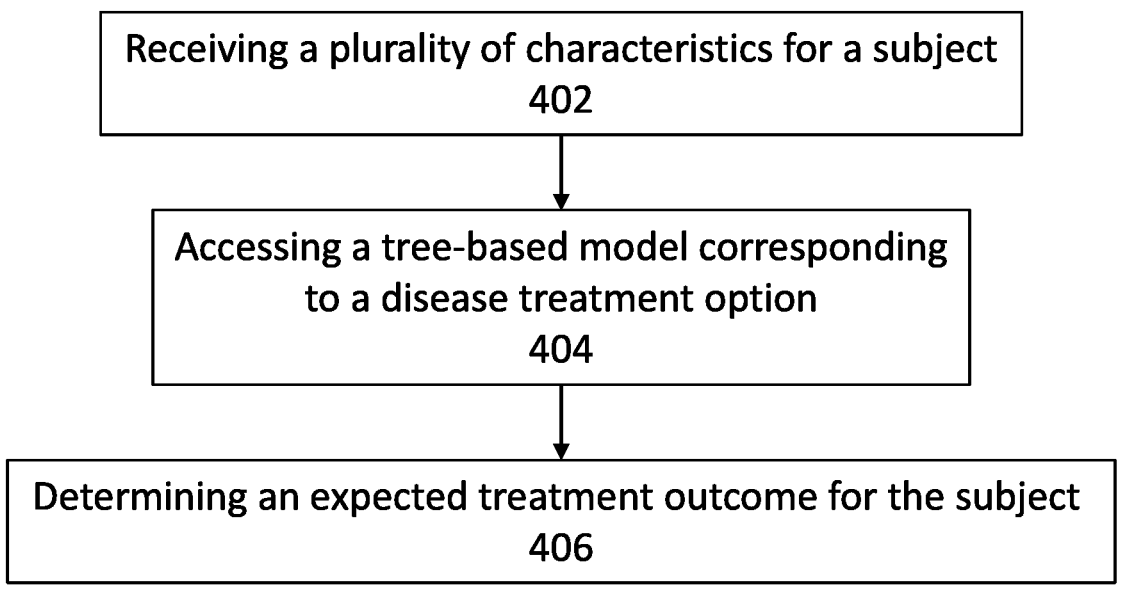
FIG. 4 shows an exemplary process for determining an expected treatment outcome for a subject having a disease.

FIG. 4 provides a non-limiting example of a method of determining an expected treatment outcome for a subject having a disease. Process 400 can be performed, for example, using one or more electronic devices implementing a software platform. In some examples, process 400 is performed using a client-server system, and the blocks of process 400 are divided up in any manner between the server and a client device. In other examples, the blocks of process 400 are divided up between the server and multiple client devices. Thus, while portions of process 400 are described herein as being performed by particular devices of a client-server system, it will be appreciated that process 400 is not so limited. In other examples, process 400 is performed using only a client device or only multiple client devices. In process 400, some blocks are, optionally, combined, the order of some blocks is, optionally, changed, and some blocks are, optionally, omitted. In some examples, additional steps may be performed in combination with the process 400. Accordingly, the operations as illustrated (and described in greater detail below) are exemplary by nature and, as such, should not be viewed as limiting.

At step 402, the process 400 includes receiving (e.g., at one or more processors) a plurality of subject characteristics for the subject. Exemplary subject characteristics can include, but are not limited to, age, sex, race, year of cancer diagnosis, time since cancer diagnosis, time since diagnosis of metastatic disease, a biomarker value, a comorbidity, a list of prior therapies, a baseline ctDNA value, a practice setting, or a performance status. At 404, a tree-based model corresponding to a treatment option for the disease is accessed (e.g., using the one or more processors). The tree-based model is generated based on a plurality of prior patient characteristics and an associated treatment outcome for the corresponding treatment option. Treatment outcomes can be, for example, determined during one or more clinical trials, or outside of a clinical trial. Exemplary treatment outcomes may include, for example, an overall survival time, a progression free survival time, a tumor response, a change in ctDNA level in the subject, disease remission, or a resistance to treatment. Exemplary prior patient characters can include, but are not limited to, of age, sex, race, year of cancer diagnosis, time since cancer diagnosis, time since diagnosis of metastatic disease, a biomarker value, a comorbidity, a list of prior therapies, a baseline ctDNA value, a practice setting, or a performance status. The tree-based model may be a tree-based regression model and/or an ensemble tree model, The tree-based model may be, for example, a Bayesian additive regression model. Uncertainty in the tree-based model may be accounted for using a Markov chain Monte Carlo process, a bagging process, a non-Bayesian model, or any other suitable process. The tree-based model may be stored, for example, in a non-transitory computer readable medium.

An expected treatment outcome for the subject is determined at 406. The expectation assumes that the patient is treated with the corresponding treatment option. The determination is made from the plurality of characters for the subject and the tree-based model. The expectation can be made, for example, by weighting a plurality of nodes in each tree-based model based on commonality between the plurality of subject characteristics and the plurality of prior patient characteristics.

The methods described herein can be used to treat a subject having a disease. For example, a method for treating a subject having a disease can include determining an expected treatment outcome for the subject for two or more treatment options according to the method described herein. The treatment option most likely to be effective for treating the disease in the subject from among the two or more treatment options may be selected, and the selected treatment option is administered to the subject.

Diseases and Treatment Options

The methods described herein may be used to predict the treatment outcome of a disease. Exemplary disease can include, but are not limited to, a hyerproliferative disease (e.g., cancer), aneuploidy disorders (such as Down Syndrome, Edwards syndrome, or Patau syndrome), Fragile X, or neurological disorders (e.g., Amyotrophc Lateral Sclerosis, Alzheimer's Disease, Parkinson's Disease, stroke, or Guillain-Barré syndrome). In some instances, the disease is a cancer. In some instances, the cancer is a solid tumor or a metastatic form thereof. In some instances, the cancer is a hematological cancer, e.g. a leukemia or lymphoma.

In some instances, the subject has a cancer or is at risk of having a cancer. For example, in some instances, the subject has a genetic predisposition to a cancer (e.g., having a genetic mutation that increases his or her baseline risk for developing a cancer). In some instances, the subject has been exposed to an environmental perturbation (e.g., radiation or a chemical) that increases his or her risk for developing a cancer. In some instances, the subject is in need of being monitored for development of a cancer. In some instances, the subject is in need of being monitored for cancer progression or regression, e.g., after being treated with an anti-cancer therapy (or anti-cancer treatment). In some instances, the subject is in need of being monitored for relapse of cancer. In some instances, the subject is in need of being monitored for minimum residual disease (MRD). In some instances, the subject has been, or is being treated, for cancer. In some instances, the subject has not been treated with an anti-cancer therapy (or anti-cancer treatment).

In some instances, the subject (e.g., a patient) is being treated, or has been previously treated, with one or more targeted therapies. In some instances, e.g., for a patient who has been previously treated with a targeted therapy, a post-targeted therapy sample (e.g., specimen) is obtained (e.g., collected). In some instances, the post-targeted therapy sample is a sample obtained after the completion of the targeted therapy.

In some instances, the patient has not been previously treated with a targeted therapy. In some instances, e.g., for a patient who has not been previously treated with a targeted therapy, the sample comprises a resection, e.g., an original resection, or a resection following recurrence (e.g., following a disease recurrence post-therapy).

Exemplary cancers include, but are not limited to, B cell cancer (e.g., multiple myeloma), melanomas, breast cancer, lung cancer (such as non-small cell lung carcinoma or NSCLC), bronchus cancer, colorectal cancer, prostate cancer, pancreatic cancer, stomach cancer, ovarian cancer, urinary bladder cancer, brain or central nervous system cancer, peripheral nervous system cancer, esophageal cancer, cervical cancer, uterine or endometrial cancer, cancer of the oral cavity or pharynx, liver cancer, kidney cancer, testicular cancer, biliary tract cancer, small bowel or appendix cancer, salivary gland cancer, thyroid gland cancer, adrenal gland cancer, osteosarcoma, chondrosarcoma, cancer of hematological tissues, adenocarcinomas, inflammatory myofibroblastic tumors, gastrointestinal stromal tumor (GIST), colon cancer, multiple myeloma (MM), myelodysplastic syndrome (MDS), myeloproliferative disorder (MPD), acute lymphocytic leukemia (ALL), acute myelocytic leukemia (AML), chronic myelocytic leukemia (CML), chronic lymphocytic leukemia (CLL), polycythemia Vera, Hodgkin lymphoma, non-Hodgkin lymphoma (NHL), soft-tissue sarcoma, fibrosarcoma, myxosarcoma, liposarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, squamous cell carcinoma, basal cell carcinoma, adenocarcinoma, sweat gland carcinoma, sebaceous gland carcinoma, papillary carcinoma, papillary adenocarcinomas, medullary carcinoma, bronchogenic carcinoma, renal cell carcinoma, hepatoma, bile duct carcinoma, choriocarcinoma, seminoma, embryonal carcinoma, Wilms' tumor, bladder carcinoma, epithelial carcinoma, glioma, astrocytoma, medulloblastoma, craniopharyngioma, ependymoma, pinealoma, hemangioblastoma, acoustic neuroma, oligodendroglioma, meningioma, neuroblastoma, retinoblastoma, follicular lymphoma, diffuse large B-cell lymphoma, mantle cell lymphoma, hepatocellular carcinoma, thyroid cancer, gastric cancer, head and neck cancer, small cell cancers, essential thrombocythemia, agnogenic myeloid metaplasia, hypereosinophilic syndrome, systemic mastocytosis, familiar hypereosinophilia, chronic eosinophilic leukemia, neuroendocrine cancers, carcinoid tumors, and the like.

In some instances, the cancer is a hematologic malignancy (or premaligancy). As used herein, a hematologic malignancy refers to a tumor of the hematopoietic or lymphoid tissues, e.g., a tumor that affects blood, bone marrow, or lymph nodes. Exemplary hematologic malignancies include, but are not limited to, leukemia (e.g., acute lymphoblastic leukemia (ALL), acute myeloid leukemia (AML), chronic lymphocytic leukemia (CLL), chronic myelogenous leukemia (CML), hairy cell leukemia, acute monocytic leukemia (AMoL), chronic myelomonocytic leukemia (CMML), juvenile myelomonocytic leukemia (JMML), or large granular lymphocytic leukemia), lymphoma (e.g., AIDS-related lymphoma, cutaneous T-cell lymphoma, Hodgkin lymphoma (e.g., classical Hodgkin lymphoma or nodular lymphocyte-predominant Hodgkin lymphoma), mycosis fungoides, non-Hodgkin lymphoma (e.g., B-cell non-Hodgkin lymphoma (e.g., Burkitt lymphoma, small lymphocytic lymphoma (CLL/SLL), diffuse large B-cell lymphoma, follicular lymphoma, immunoblastic large cell lymphoma, precursor B-lymphoblastic lymphoma, or mantle cell lymphoma) or T-cell non-Hodgkin lymphoma (mycosis fungoides, anaplastic large cell lymphoma, or precursor T-lymphoblastic lymphoma)), primary central nervous system lymphoma, Sézary syndrome, Waldenström macroglobulinemia), chronic myeloproliferative neoplasm, Langerhans cell histiocytosis, multiple myeloma/plasma cell neoplasm, myelodysplastic syndrome, or myelodysplastic/myeloproliferative neoplasm.

Treatment options may depend on the disease to be treated. Exemplary treatment options for the treatment of cancer can include, but are not limited to, In some instances, for example, the anti-cancer therapy or treatment may comprise use of a poly (ADP-ribose) polymerase inhibitor (PARPi), a kinase inhibitor (e.g., a multi-kinase inhibitor or a kinase specific inhibitor), an alkylating agent, an antimetabolite, a hormone, a platinum compound, chemotherapy, radiation therapy, a targeted therapy (e.g., immunotherapy), surgery, or any combination thereof. In some implementations, the treatment option may be a dose of a therapeutic agent. For example, the method may be used to determine a treatment outcome for two or more different doses of the same therapeutic agent, and the dose with the better outcome may be selected to be administered and/or administered to the subject. In some instances, the method may be used to adjust the dose of a therapeutic administered to the subject.

Subject Characteristics and Prior Patient Characteristics

The prior patient characteristics or subject characteristics may be any feature of the patient. Exemplary characteristics include, but are not limited to, one or more of age, sex, race, year of cancer diagnosis, time since cancer diagnosis, time since diagnosis of metastatic disease, a biomarker value, a comorbidity (for example, diabetes, or heart disease), a list of prior therapies (which may optionally further include a list of time spent on each prior therapy), a baseline ctDNA value, a practice setting (e.g., a community setting or academic setting for treatment), or a performance status. Exemplary biomarker values may include, but are not limited to, a EGFR variant status (e.g., the presence or absence of a tumor-associated fusion), a NTRK variant status (e.g., the presence or absence of a tumor-associated fusion), a RET variant status (e.g., the presence or absence of a tumor-associated fusion), an ALK rearrangement variant status (e.g., the presence or absence of a tumor-associated fusion), a tumor mutational burden (TMB), HLA loss of heterozygosity (LOH) status, a germline status of a variant, a somatic status of a variant, a microsatellite instability (MSI) status, a homologous recombination deficiency (HRD) status, a genome-wide loss of heterozygosity (gLOH) status, a copy number alteration (CAN) status, a PD-L1 expression level status, a hormone receptor status, PSA expression level status, or a rate of PSA expression level increase. In some instances, the biomarker value may be the presence or absence of a tumor-associated variant, e.g., a fusion variant, in one or more genes.

Some or all of the prior patient characteristics and/or subject characteristics may be determined by sequencing nucleic acid molecules in a biological sample obtained from a prior patient or the subject, respectively. For example, sequencing nucleic acid molecules in the biological sample can be used to determine a biomarker value and/or a baseline ctDNA value. Sequence reads can be used to generate sequence read analysis date, which may be part of a genomic profile for the subject. "Sequence read analysis data" is data determined from sequencing reads, including, but not limited to, variant calls (e.g., fusions, rearrangements, nucleotide variants, or copy number variants), tumor mutational burden, loss of heterozyogisity, microsatellite instability, or gene expression data.

In some instances, the disclosed methods may further comprise one or more of the steps of: (i) obtaining the sample from the subject (e.g., a subject suspected of having or determined to have cancer), (ii) extracting nucleic acid molecules (e.g., a mixture of tumor nucleic acid molecules and non-tumor nucleic acid molecules) from the sample, (iii) ligating one or more adapters to the nucleic acid molecules extracted from the sample (e.g., one or more amplification primers, flow cell adaptor sequences, substrate adapter sequences, or sample index sequences), (iv) amplifying the nucleic acid molecules (e.g., using a polymerase chain reaction (PCR) amplification technique, a non-PCR amplification technique, or an isothermal amplification technique), (v) capturing nucleic acid molecules from the amplified nucleic acid molecules (e.g., by hybridization to one or more bait molecules, where the bait molecules each comprise one or more nucleic acid molecules that each comprising a region that is complementary to a region of a captured nucleic acid molecule), (vi) sequencing the nucleic acid molecules extracted from the sample (or library proxies derived therefrom) using, e.g., a next-generation (massively parallel) sequencing technique, a whole genome sequencing (WGS) technique, a whole exome sequencing technique, a targeted sequencing technique, a direct sequencing technique, or a Sanger sequencing technique) using, e.g., a next-generation (massively parallel) sequencer, and (vii) generating, displaying, transmitting, and/or delivering a report (e.g., an electronic, web-based, or paper report) to the subject (or patient), a caregiver, a healthcare provider, a physician, an oncologist, an electronic medical record system, a hospital, a clinic, a third-party payer, an insurance company, or a government office. In some instances, the report comprises output from the methods described herein. In some instances, all or a portion of the report may be displayed in the graphical user interface of an online or web-based healthcare portal. In some instances, the report is transmitted via a computer network or peer-to-peer connection.

The disclosed methods may be used with any of a variety of samples. The sample may be obtained from the subject or a prior patient for the determination of subject characteristics and/or prior patient characteristics. For example, in some instances, the sample may comprise a tissue biopsy sample, a liquid biopsy sample, or a normal control. In some instances, the sample may be a liquid biopsy sample and may comprise blood, plasma, cerebrospinal fluid, sputum, stool, urine, or saliva. In some instances, the sample may be a liquid biopsy sample and may comprise circulating tumor cells (CTCs). In some instances, the sample may be a liquid biopsy sample and may comprise cell-free DNA (cfDNA), circulating tumor DNA (ctDNA), or any combination thereof. In certain instances, the sample may be frozen sample or a formalin-fixed paraffin-embedded (FFPE) sample.

In some instances, the sample may be collected by tissue resection (e.g., surgical resection), needle biopsy, bone marrow biopsy, bone marrow aspiration, skin biopsy, endoscopic biopsy, fine needle aspiration, oral swab, nasal swab, vaginal swab or a cytology smear, scrapings, washings or lavages (such as a ductal lavages or bronchoalveolar lavages), etc.

In some instances, the sample may comprise one or more premalignant or malignant cells. Premalignant, as used herein, refers to a cell or tissue that is not yet malignant but is poised to become malignant. In certain instances, the sample may be acquired from a solid tumor, a soft tissue tumor, or a metastatic lesion. In certain instances, the sample may be acquired from a hematologic malignancy or premalignancy. In other instances, the sample may comprise a tissue or cells from a surgical margin. In certain instances, the sample may comprise tumor-infiltrating lymphocytes. In some instances, the sample may comprise one or more non-malignant cells. In some instances, the sample may be, or is part of, a primary tumor or a metastasis (e.g., a metastasis biopsy sample). In some instances, the sample may be obtained from a site (e.g., a tumor site) with the highest percentage of tumor (e.g., tumor cells) as compared to adjacent sites (e.g., sites adjacent to the tumor). In some instances, the sample may be obtained from a site (e.g., a tumor site) with the largest tumor focus (e.g., the largest number of tumor cells as visualized under a microscope) as compared to adjacent sites (e.g., sites adjacent to the tumor).

In some instances, the nucleic acids extracted from the sample may comprise deoxyribonucleic acid (DNA) molecules. Examples of DNA that may be suitable for analysis by the disclosed methods include, but are not limited to, genomic DNA or fragments thereof, mitochondrial DNA or fragments thereof, cell-free DNA (cfDNA), and circulating tumor DNA (ctDNA). Cell-free DNA (cfDNA) is comprised of fragments of DNA that are released from normal and/or cancerous cells during apoptosis and necrosis, and circulate in the blood stream and/or accumulate in other bodily fluids. Circulating tumor DNA (ctDNA) is comprised of fragments of DNA that are released from cancerous cells and tumors that circulate in the blood stream and/or accumulate in other bodily fluids. In some instances, DNA is extracted from nucleated cells from the sample. In some instances, a sample may have a low nucleated cellularity, e.g., when the sample is comprised mainly of erythrocytes, lesional cells that contain excessive cytoplasm, or tissue with fibrosis. In some instances, a sample with low nucleated cellularity may require more, e.g., greater, tissue volume for DNA extraction.

In some instances, the nucleic acids extracted from the sample may comprise ribonucleic acid (RNA) molecules. Examples of RNA that may be suitable for analysis by the disclosed methods include, but are not limited to, total cellular RNA, total cellular RNA after depletion of certain abundant RNA sequences (e.g., ribosomal RNAs), cell-free RNA (cfRNA), messenger RNA (mRNA) or fragments thereof, the poly(A)-tailed mRNA fraction of the total RNA, ribosomal RNA (rRNA) or fragments thereof, transfer RNA (tRNA) or fragments thereof, and mitochondrial RNA or fragments thereof. In some instances, RNA may be extracted from the sample and converted to complementary DNA (cDNA) using, e.g., a reverse transcription reaction. In some instances, the cDNA is produced by random-primed cDNA synthesis methods. In other instances, the cDNA synthesis is initiated at the poly(A) tail of mature mRNAs by priming with oligo(dT)-containing oligonucleotides. Methods for depletion, poly(A) enrichment, and cDNA synthesis are well known to those of skill in the art.

In some instances, the sample may comprise a tumor content, e.g., comprising tumor cells or tumor cell nuclei. In some instances, the sample may comprise a tumor content of at least 5-50%, 10-40%, 15-25%, or 20-30% tumor cell nuclei. In some instances, the sample may comprise a tumor content of at least 5%, at least 10%, at least 20%, at least 30%, at least 40%, or at least 50% tumor cell nuclei. In some instances, the percent tumor cell nuclei is determined (e.g., calculated) by dividing the number of tumor cells in the sample by the total number of all cells within the sample that have nuclei. In some instances, for example when the sample is a liver sample comprising hepatocytes, a different tumor content calculation may be required due to the presence of hepatocytes having nuclei with twice, or more than twice, the DNA content of other, e.g., non-hepatocyte, somatic cell nuclei. In some instances, the sensitivity of detection of a genetic alteration, e.g., a variant sequence, or a determination of, e.g., microsatellite instability, may depend on the tumor content of the sample. For example, a sample having a lower tumor content can result in lower sensitivity of detection for a given size sample.

In some instances, as noted above, the sample comprises nucleic acid (e.g., DNA, RNA (or a cDNA derived from the RNA), or both), e.g., from a tumor or from normal tissue. In certain instances, the sample may further comprise a non-nucleic acid component, e.g., cells, protein, carbohydrate, or lipid, e.g., from the tumor or normal tissue.

DNA or RNA may be extracted from tissue samples, biopsy samples, blood samples, or other bodily fluid samples using any of a variety of techniques known to those of skill in the art (see, e.g., Example 1 of International Patent Application Publication No. WO 2012/092426; Tan, et al. (2009), "DNA, RNA, and Protein Extraction: The Past and The Present", J. Biomed. Biotech. 2009:574398; the technical literature for the Maxwell® 16 LEV Blood DNA Kit (Promega Corporation, Madison, WI); and the Maxwell 16 Buccal Swab LEV DNA Purification Kit Technical Manual (Promega Literature #TM333, Jan. 1, 2011, Promega Corporation, Madison, WI)). Protocols for RNA isolation are disclosed in, e.g., the Maxwell® 16 Total RNA Purification Kit Technical Bulletin (Promega Literature #TB351, August 2009, Promega Corporation, Madison, WI).

A typical DNA extraction procedure, for example, comprises (i) collection of the fluid sample, cell sample, or tissue sample from which DNA is to be extracted, (ii) disruption of cell membranes (i.e., cell lysis), if necessary, to release DNA and other cytoplasmic components, (iii) treatment of the fluid sample or lysed sample with a concentrated salt solution to precipitate proteins, lipids, and RNA, followed by centrifugation to separate out the precipitated proteins, lipids, and RNA, and (iv) purification of DNA from the supernatant to remove detergents, proteins, salts, or other reagents used during the cell membrane lysis step.

Disruption of cell membranes may be performed using a variety of mechanical shear (e.g., by passing through a French press or fine needle) or ultrasonic disruption techniques. The cell lysis step often comprises the use of detergents and surfactants to solubilize lipids the cellular and nuclear membranes. In some instances, the lysis step may further comprise use of proteases to break down protein, and/or the use of an RNase for digestion of RNA in the sample.

Examples of suitable techniques for DNA purification include, but are not limited to, (i) precipitation in ice-cold ethanol or isopropanol, followed by centrifugation (precipitation of DNA may be enhanced by increasing ionic strength, e.g., by addition of sodium acetate), (ii) phenol-chloroform extraction, followed by centrifugation to separate the aqueous phase containing the nucleic acid from the organic phase containing denatured protein, and (iii) solid phase chromatography where the nucleic acids adsorb to the solid phase (e.g., silica or other) depending on the pH and salt concentration of the buffer.

In some instances, cellular and histone proteins bound to the DNA may be removed either by adding a protease or by having precipitated the proteins with sodium or ammonium acetate, or through extraction with a phenol-chloroform mixture prior to a DNA precipitation step.

In some instances, DNA may be extracted using any of a variety of suitable commercial DNA extraction and purification kits. Examples include, but are not limited to, the QIAamp (for isolation of genomic DNA from human samples) and DNAeasy (for isolation of genomic DNA from animal or plant samples) kits from Qiagen (Germantown, MD) or the Maxwell® and ReliaPrep™ series of kits from Promega (Madison, WI).

As noted above, in some instances the sample may comprise a formalin-fixed (also known as formaldehyde-fixed, or paraformaldehyde-fixed), paraffin-embedded (FFPE) tissue preparation. For example, the FFPE sample may be a tissue sample embedded in a matrix, e.g., an FFPE block. Methods to isolate nucleic acids (e.g., DNA) from formaldehyde- or paraformaldehyde-fixed, paraffin-embedded (FFPE) tissues are disclosed in, e.g., Cronin, et al., (2004) *Am J Pathol.* 164(1):35-42; Masuda, et al., (1999) *Nucleic Acids Res.* 27(22):4436-4443; Specht, et al., (2001) *Am J Pathol.* 158(2):419-429; the Ambion RecoverAll™ Total Nucleic Acid Isolation Protocol (Ambion, Cat. No. AM1975, September 2008); the Maxwell® 16 FFPE Plus LEV DNA Purification Kit Technical Manual (Promega Literature #TM349, February 2011); the E.Z.N.A.® FFPE DNA Kit Handbook (OMEGA bio-tek, Norcross, GA, product numbers D3399-00, D3399-01, and D3399-02, June 2009); and the QIAamp® DNA FFPE Tissue Handbook (Qiagen, Cat. No. 37625, October 2007). For example, the RecoverAll™ Total Nucleic Acid Isolation Kit uses xylene at elevated temperatures to solubilize paraffin-embedded samples and a glass-fiber filter to capture nucleic acids. The Maxwell® 16 FFPE Plus LEV DNA Purification Kit is used with the Maxwell® 16 Instrument for purification of genomic DNA from 1 to 10 µm sections of FFPE tissue. DNA is purified using silica-clad paramagnetic particles (PMPs), and eluted in low elution volume. The E.Z.N.A.® FFPE DNA Kit uses a spin column and buffer system for isolation of genomic DNA. QIAamp® DNA FFPE Tissue Kit uses QIAamp® DNA Micro technology for purification of genomic and mitochondrial DNA.

In some instances, the disclosed methods may further comprise determining or acquiring a yield value for the nucleic acid extracted from the sample and comparing the determined value to a reference value. For example, if the determined or acquired value is less than the reference value, the nucleic acids may be amplified prior to proceeding with library construction. In some instances, the disclosed methods may further comprise determining or acquiring a value for the size (or average size) of nucleic acid fragments in the sample, and comparing the determined or acquired value to a reference value, e.g., a size (or average size) of at least 100, 200, 300, 400, 500, 600, 700, 800, 900, or 1000 base pairs (bps). In some instances, one or more parameters described herein may be adjusted or selected in response to this determination.

After isolation, the nucleic acids are typically dissolved in a slightly alkaline buffer, e.g., Tris-EDTA (TE) buffer, or in ultra-pure water. In some instances, the isolated nucleic acids (e.g., genomic DNA) may be fragmented or sheared by using any of a variety of techniques known to those of skill in the art. For example, genomic DNA can be fragmented by physical shearing methods, enzymatic cleavage methods, chemical cleavage methods, and other methods known to those of skill in the art. Methods for DNA shearing are described in Example 4 in International Patent Application Publication No. WO 2012/092426. In some instances, alternatives to DNA shearing methods can be used to avoid a ligation step during library preparation.

In some instances, the nucleic acids isolated from the sample may be used to construct a library (e.g., a nucleic acid library as described herein). In some instances, the nucleic acids are fragmented using any of the methods described above, optionally subjected to repair of chain end damage, and optionally ligated to synthetic adapters, primers, and/or barcodes (e.g., amplification primers, sequencing adapters, flow cell adapters, substrate adapters, sample barcodes or indexes, and/or unique molecular identifier sequences), size-selected (e.g., by preparative gel electrophoresis), and/or amplified (e.g., using PCR, a non-PCR amplification technique, or an isothermal amplification technique). In some instances, the fragmented and adapter-ligated group of nucleic acids is used without explicit size selection or amplification prior to hybridization-based selection of target sequences. In some instances, the nucleic acid is amplified by any of a variety of specific or non-specific nucleic acid amplification methods known to those of skill in the art. In some instances, the nucleic acids are amplified, e.g., by a whole-genome amplification method such as random-primed strand-displacement amplification. Examples of nucleic acid library preparation techniques for next-generation sequencing are described in, e.g., van Dijk, et al. (2014), Exp. Cell Research 322:12-20, and Illumina's genomic DNA sample preparation kit.

In some instances, the resulting nucleic acid library may contain all or substantially all of the complexity of the genome. The term "substantially all" in this context refers to the possibility that there can in practice be some unwanted loss of genome complexity during the initial steps of the procedure. The methods described herein also are useful in cases where the nucleic acid library comprises a portion of the genome, e.g., where the complexity of the genome is reduced by design. In some instances, any selected portion of the genome can be used with a method described herein. For example, in certain embodiments, the entire exome or a subset thereof is isolated. In some instances, the library may include at least 95%, 90%, 80%, 70%, 60%, 50%. 40%. 30%, 20%, 10%, or 5% of the genomic DNA. In some instances, the library may consist of cDNA copies of genomic DNA that includes copies of at least 95%, 90%, 80%, 70%, 60%, 50%, 40%, 30%, 20%, 10%, or 5% of the genomic DNA. In certain instances, the amount of nucleic acid used to generate the nucleic acid library may be less than 5 micrograms, less than 1 microgram, less than 500 ng, less than 200 ng, less than 100 ng, less than 50 ng, less than 10 ng, less than 5 ng, or less than 1 ng.

In some instances, a library (e.g., a nucleic acid library) includes a collection of nucleic acid molecules. As described herein, the nucleic acid molecules of the library can include a target nucleic acid molecule (e.g., a tumor nucleic acid molecule, a reference nucleic acid molecule and/or a control nucleic acid molecule; also referred to herein as a first, second and/or third nucleic acid molecule, respectively). The nucleic acid molecules of the library can be from a single subject or individual. In some instances, a library can comprise nucleic acid molecules derived from more than one subject (e.g., 2, 3, 4, 5, 6, 7, 8, 9, 10, 20, 30 or more subjects). For example, two or more libraries from different subjects can be combined to form a library having nucleic acid molecules from more than one subject (where the nucleic acid molecules derived from each subject are optionally ligated to a unique sample barcode corresponding to a specific subject). In some instances, the subject is a human having, or at risk of having, a cancer or tumor.

In some instances, the library (or a portion thereof) may comprise one or more subgenomic intervals. In some instances, a subgenomic interval can be a single nucleotide position, e.g., a nucleotide position for which a variant at the position is associated (positively or negatively) with a tumor phenotype. In some instances, a subgenomic interval comprises more than one nucleotide position. Such instances include sequences of at least 2, 5, 10, 50, 100, 150, 250, or more than 250 nucleotide positions in length. Subgenomic intervals can comprise, e.g., one or more entire genes (or portions thereof), one or more exons or coding sequences (or portions thereof), one or more introns (or portion thereof), one or more microsatellite region (or portions thereof), or any combination thereof. A subgenomic interval can comprise all or a part of a fragment of a naturally occurring nucleic acid molecule, e.g., a genomic DNA molecule. For example, a subgenomic interval can correspond to a fragment of genomic DNA which is subjected to a sequencing reaction. In some instances, a subgenomic interval is a continuous sequence from a genomic source. In some instances, a subgenomic interval includes sequences that are not contiguous in the genome, e.g., subgenomic intervals in cDNA can include exon-exon junctions formed as a result of splicing. In some instances, the subgenomic interval comprises a tumor nucleic acid molecule. In some instances, the subgenomic interval comprises a non-tumor nucleic acid molecule.

The methods described herein can be used in combination with, or as part of, a method for evaluating a plurality or set of subject intervals (e.g., target sequences), e.g., from a set of genomic loci (e.g., gene loci or fragments thereof), as described herein.

In some instances, the set of genomic loci evaluated by the disclosed methods comprises a plurality of, e.g., genes, which in mutant form, are associated with an effect on cell division, growth or survival, or are associated with a cancer, e.g., a cancer described herein.

In some instances, the set of gene loci evaluated by the disclosed methods comprises at least 1, at least 2, at least 3, at least 4, at least 5, at least 6, at least 7, at least 8, at least 9, at least 10, at least 20, at least 30, at least 40, at least 50, at least 60, at least 70, at least 80, at least 90, at least 100, or more than 100 gene loci.

In some instances, the selected gene loci (also referred to herein as target gene loci or target sequences), or fragments thereof, may include subject intervals comprising non-coding sequences, coding sequences, intragenic regions, or intergenic regions of the subject genome. For example, the subject intervals can include a non-coding sequence or fragment thereof (e.g., a promoter sequence, enhancer sequence, 5' untranslated region (5' UTR), 3' untranslated region (3' UTR), or a fragment thereof), a coding sequence of fragment thereof, an exon sequence or fragment thereof, an intron sequence or a fragment thereof.

The methods described herein may comprise contacting a nucleic acid library with a plurality of target capture reagents in order to select and capture a plurality of specific target sequences (e.g., gene sequences or fragments thereof) for analysis. In some instances, a target capture reagent (i.e., a molecule which can bind to and thereby allow capture of a target molecule) is used to select the subject intervals to be analyzed. For example, a target capture reagent can be a bait molecule, e.g., a nucleic acid molecule (e.g., a DNA molecule or RNA molecule) which can hybridize to (i.e., is complementary to) a target molecule, and thereby allows capture of the target nucleic acid. In some instances, the target capture reagent, e.g., a bait molecule (or bait sequence), is a capture oligonucleotide (or capture probe). In some instances, the target nucleic acid is a genomic DNA molecule, an RNA molecule, a cDNA molecule derived from an RNA molecule, a microsatellite DNA sequence, and the like. In some instances, the target capture reagent is suitable for solution-phase hybridization to the target. In some instances, the target capture reagent is suitable for solid-phase hybridization to the target. In some instances, the target capture reagent is suitable for both solution-phase and solid-phase hybridization to the target. The design and construction of target capture reagents is described in more detail in, e.g., International Patent Application Publication No. WO 2020/236941, the entire content of which is incorporated herein by reference.

The methods described herein provide for optimized sequencing of a large number of genomic loci (e.g., genes or gene products (e.g., mRNA), microsatellite loci, etc.) from samples (e.g., cancerous tissue specimens, liquid biopsy samples, and the like) from one or more subjects by the appropriate selection of target capture reagents to select the target nucleic acid molecules to be sequenced. In some instances, a target capture reagent may hybridize to a specific target locus, e.g., a specific target gene locus or fragment thereof. In some instances, a target capture reagent may hybridize to a specific group of target loci, e.g., a specific group of gene loci or fragments thereof. In some instances, a plurality of target capture reagents comprising a mix of target-specific and/or group-specific target capture reagents may be used.

In some instances, the number of target capture reagents (e.g., bait molecules) in the plurality of target capture reagents (e.g., a bait set) contacted with a nucleic acid library to capture a plurality of target sequences for nucleic acid sequencing is greater than 10, greater than 50, greater than 100, greater than 200, greater than 300, greater than 400, greater than 500, greater than 600, greater than 700, greater than 800, greater than 900, greater than 1,000, greater than 1,250, greater than 1,500, greater than 1,750, greater than 2,000, greater than 3,000, greater than 4,000, greater than 5,000, greater than 10,000, greater than 25,000, or greater than 50,000.

In some instances, the overall length of the target capture reagent sequence can be between about 70 nucleotides and 1000 nucleotides. In one instance, the target capture reagent length is between about 100 and 300 nucleotides, 110 and 200 nucleotides, or 120 and 170 nucleotides, in length. In addition to those mentioned above, intermediate oligonucleotide lengths of about 70, 80, 90, 100, 110, 120, 130, 140, 150, 160, 170, 180, 190, 200, 210, 220, 230, 240, 250, 300, 400, 500, 600, 700, 800, and 900 nucleotides in length can be used in the methods described herein. In some embodiments, oligonucleotides of about 70, 80, 90, 100, 110, 120, 130, 140, 150, 160, 170, 180, 190, 200, 210, 220, or 230 bases can be used.

In some instances, each target capture reagent sequence can include: (i) a target-specific capture sequence (e.g., a gene locus or microsatellite locus-specific complementary sequence), (ii) an adapter, primer, barcode, and/or unique molecular identifier sequence, and (iii) universal tails on one or both ends. As used herein, the term "target capture reagent" can refer to the target-specific target capture sequence or to the entire target capture reagent oligonucleotide including the target-specific target capture sequence.

In some instances, the target-specific capture sequences in the target capture reagents are between about 40 nucleotides and 1000 nucleotides in length. In some instances, the target-specific capture sequence is between about 70 nucleotides and 300 nucleotides in length. In some instances, the target-specific sequence is between about 100 nucleotides and 200 nucleotides in length. In yet other instances, the target-specific sequence is between about 120 nucleotides and 170 nucleotides in length, typically 120 nucleotides in length. Intermediate lengths in addition to those mentioned above also can be used in the methods described herein, such as target-specific sequences of about 40, 50, 60, 70, 80, 90, 100, 110, 120, 130, 140, 150, 160, 170, 180, 190; 200, 210, 220, 230, 240, 250, 300, 400, 500, 600, 700, 800, and 900 nucleotides in length, as well as target-specific sequences of lengths between the above-mentioned lengths.

In some instances, the target capture reagent may be designed to select a subject interval containing one or more rearrangements, e.g., an intron containing a genomic rearrangement. In such instances, the target capture reagent is designed such that repetitive sequences are masked to increase the selection efficiency. In those instances where the rearrangement has a known juncture sequence, complementary target capture reagents can be designed to recognize the juncture sequence to increase the selection efficiency.

In some instances, the disclosed methods may comprise the use of target capture reagents designed to capture two or more different target categories, each category having a different target capture reagent design strategy. In some instances, the hybridization-based capture methods and target capture reagent compositions disclosed herein may provide for the capture and homogeneous coverage of a set of target sequences, while minimizing coverage of genomic sequences outside of the targeted set of sequences. In some instances, the target sequences may include the entire exome of genomic DNA or a selected subset thereof. In some instances, the target sequences may include, e.g., a large chromosomal region (e.g., a whole chromosome arm). The methods and compositions disclosed herein provide different target capture reagents for achieving different sequencing depths and patterns of coverage for complex sets of target nucleic acid sequences.

Typically, DNA molecules are used as target capture reagent sequences, although RNA molecules can also be used. In some instances, a DNA molecule target capture reagent can be single stranded DNA (ssDNA) or double-stranded DNA (dsDNA). In some instances, an RNA-DNA duplex is more stable than a DNA-DNA duplex and therefore provides for potentially better capture of nucleic acids.

In some instances, the disclosed methods comprise providing a selected set of nucleic acid molecules (e.g., a library catch) captured from one or more nucleic acid libraries. For example, the method may comprise: providing one or a plurality of nucleic acid libraries, each comprising a plurality of nucleic acid molecules (e.g., a plurality of target nucleic acid molecules and/or reference nucleic acid molecules) extracted from one or more samples from one or more subjects; contacting the one or a plurality of libraries (e.g., in a solution-based hybridization reaction) with one, two, three, four, five, or more than five pluralities of target capture reagents (e.g., oligonucleotide target capture reagents) to form a hybridization mixture comprising a plurality of target capture reagent/nucleic acid molecule hybrids; separating the plurality of target capture reagent/nucleic acid molecule hybrids from said hybridization mixture, e.g., by contacting said hybridization mixture with a binding entity that allows for separation of said plurality of target capture reagent/nucleic acid molecule hybrids from the hybridization mixture, thereby providing a library catch (e.g., a selected or enriched subgroup of nucleic acid molecules from the one or a plurality of libraries).

In some instances, the disclosed methods may further comprise amplifying the library catch (e.g., by performing PCR). In other instances, the library catch is not amplified.

In some instances, the target capture reagents can be part of a kit which can optionally comprise instructions, standards, buffers or enzymes or other reagents.

As noted above, the methods disclosed herein may include the step of contacting the library (e.g., the nucleic acid library) with a plurality of target capture reagents to provide a selected library target nucleic acid sequences (i.e., the library catch). The contacting step can be effected in, e.g., solution-based hybridization. In some instances, the method includes repeating the hybridization step for one or more additional rounds of solution-based hybridization. In some instances, the method further includes subjecting the library catch to one or more additional rounds of solution-based hybridization with the same or a different collection of target capture reagents.

In some instances, the contacting step is effected using a solid support, e.g., an array. Suitable solid supports for hybridization are described in, e.g., Albert, T. J. et al. (2007) Nat. Methods 4(11):903-5; Hodges, E. et al. (2007) Nat. Genet. 39(12):1522-7; and Okou, D. T. et al. (2007) Nat.

Methods 4(11):907-9, the contents of which are incorporated herein by reference in their entireties.

Hybridization methods that can be adapted for use in the methods herein are described in the art, e.g., as described in International Patent Application Publication No. WO 2012/092426. Methods for hybridizing target capture reagents to a plurality of target nucleic acids are described in more detail in, e.g., International Patent Application Publication No. WO 2020/236941, the entire content of which is incorporated herein by reference.

The methods and systems disclosed herein can be used in combination with, or as part of, a method or system for sequencing nucleic acids (e.g., a next-generation sequencing system) to generate a plurality of sequence reads that overlap one or more gene loci within a subgenomic interval in the sample and thereby determine, e.g., gene allele sequences at a plurality of gene loci. "Next-generation sequencing" (or "NGS") as used herein may also be referred to as "massively parallel sequencing", and refers to any sequencing method that determines the nucleotide sequence of either individual nucleic acid molecules (e.g., as in single molecule sequencing) or clonally expanded proxies for individual nucleic acid molecules in a high throughput fashion (e.g., wherein greater than $10^3$, $10^4$, $10^5$ or more than $10^5$ molecules are sequenced simultaneously).

Next-generation sequencing methods are known in the art, and are described in, e.g., Metzker, M. (2010) *Nature Biotechnology Reviews* 11:31-46, which is incorporated herein by reference. Other examples of sequencing methods suitable for use when implementing the methods and systems disclosed herein are described in, e.g., International Patent Application Publication No. WO 2012/092426. In some instances, the sequencing may comprise, for example, whole genome sequencing (WGS), whole exome sequencing, targeted sequencing, or direct sequencing. In some instances, sequencing may be performed using, e.g., Sanger sequencing. In some instances, the sequencing may comprise a paired-end sequencing technique that allows both ends of a fragment to be sequenced and generates high-quality, alignable sequence data for detection of, e.g., genomic rearrangements, repetitive sequence elements, gene fusions, and novel transcripts.

The disclosed methods and systems may be implemented using sequencing platforms such as the Roche 454, Illumina Solexa, ABI-SOLiD, ION Torrent, Complete Genomics, Pacific Bioscience, Helicos, and/or the Polonator platform. In some instances, sequencing may comprise Illumina MiSeq sequencing. In some instances, sequencing may comprise Illumina HiSeq sequencing. In some instances, sequencing may comprise Illumina NovaSeq sequencing. Optimized methods for sequencing a large number of target genomic loci in nucleic acids extracted from a sample are described in more detail in, e.g., International Patent Application Publication No. WO 2020/236941, the entire content of which is incorporated herein by reference.

In certain instances, the disclosed methods comprise one or more of the steps of: (a) acquiring a library comprising a plurality of normal and/or tumor nucleic acid molecules from a sample; (b) simultaneously or sequentially contacting the library with one, two, three, four, five, or more than five pluralities of target capture reagents under conditions that allow hybridization of the target capture reagents to the target nucleic acid molecules, thereby providing a selected set of captured normal and/or tumor nucleic acid molecules (i.e., a library catch); (c) separating the selected subset of the nucleic acid molecules (e.g., the library catch) from the hybridization mixture, e.g., by contacting the hybridization mixture with a binding entity that allows for separation of the target capture reagent/nucleic acid molecule hybrids from the hybridization mixture, (d) sequencing the library catch to acquiring a plurality of reads (e.g., sequence reads) that overlap one or more subject intervals (e.g., one or more target sequences) from said library catch that may comprise a mutation (or alteration), e.g., a variant sequence comprising a somatic mutation or germline mutation; (e) aligning said sequence reads using an alignment method as described elsewhere herein; and/or (f) assigning a nucleotide value for a nucleotide position in the subject interval (e.g., calling a mutation using, e.g., a Bayesian method or other method described herein) from one or more sequence reads of the plurality.

In some instances, acquiring sequence reads for one or more subject intervals may comprise sequencing at least 1, at least 5, at least 10, at least 20, at least 30, at least 40, at least 50, at least 100, at least 150, at least 200, at least 250, at least 300, at least 350, at least 400, at least 450, at least 500, at least 550, at least 600, at least 650, at least 700, at least 750, at least 800, at least 850, at least 900, at least 950, at least 1,000, at least 1,250, at least 1,500, at least 1,750, at least 2,000, at least 2,250, at least 2,500, at least 2,750, at least 3,000, at least 3,500, at least 4,000, at least 4,500, or at least 5,000 loci, e.g., genomic loci, gene loci, microsatellite loci, etc. In some instances, acquiring a sequence read for one or more subject intervals may comprise sequencing a subject interval for any number of loci within the range described in this paragraph, e.g., for at least 2,850 gene loci.

In some instances, acquiring a sequence read for one or more subject intervals comprises sequencing a subject interval with a sequencing method that provides a sequence read length (or average sequence read length) of at least 20 bases, at least 30 bases, at least 40 bases, at least 50 bases, at least 60 bases, at least 70 bases, at least 80 bases, at least 90 bases, at least 100 bases, at least 120 bases, at least 140 bases, at least 160 bases, at least 180 bases, at least 200 bases, at least 220 bases, at least 240 bases, at least 260 bases, at least 280 bases, at least 300 bases, at least 320 bases, at least 340 bases, at least 360 bases, at least 380 bases, or at least 400 bases. In some instances, acquiring a sequence read for the one or more subject intervals may comprise sequencing a subject interval with a sequencing method that provides a sequence read length (or average sequence read length) of any number of bases within the range described in this paragraph, e.g., a sequence read length (or average sequence read length) of 56 bases.

In some instances, acquiring a sequence read for one or more subject intervals may comprise sequencing with at least 100× or more coverage (or depth) on average. In some instances, acquiring a sequence read for one or more subject intervals may comprise sequencing with at least 100×, at least 150×, at least 200×, at least 250×, at least 500×, at least 750×, at least 1,000×, at least 1,500×, at least 2,000×, at least 2,500×, at least 3,000×, at least 3,500×, at least 4,000×, at least 4,500×, at least 5,000×, at least 5,500×, or at least 6,000× or more coverage (or depth) on average. In some instances, acquiring a sequence read for one or more subject intervals may comprise sequencing with an average coverage (or depth) having any value within the range of values described in this paragraph, e.g., at least 160×.

In some instances, acquiring a read for the one or more subject intervals comprises sequencing with an average sequencing depth having any value ranging from at least 100× to at least 6,000× for greater than about 90%, 92%, 94%, 95%, 96%, 97%, 98%, or 99% of the gene loci sequenced. For example, in some instances acquiring a read for the subject interval comprises sequencing with an average sequencing depth of at least 125× for at least 99% of the gene loci sequenced. As another example, in some instances acquiring a read for the subject interval comprises sequencing with an average sequencing depth of at least 4,100× for at least 95% of the gene loci sequenced.

In some instances, the relative abundance of a nucleic acid species in the library can be estimated by counting the relative number of occurrences of their cognate sequences (e.g., the number of sequence reads for a given cognate sequence) in the data generated by the sequencing experiment.

In some instances, the disclosed methods and systems provide nucleotide sequences for a set of subject intervals (e.g., gene loci), as described herein. In certain instances, the sequences are provided without using a method that includes a matched normal control (e.g., a wild-type control) and/or a matched tumor control (e.g., primary versus metastatic).

In some instances, the level of sequencing depth as used herein (e.g., an X-fold level of sequencing depth) refers to the number of reads (e.g., unique reads) obtained after detection and removal of duplicate reads (e.g., PCR duplicate reads). In other instances, duplicate reads are evaluated, e.g., to support detection of copy number alteration (CNAs).

Alignment is the process of matching a read with a location, e.g., a genomic location or locus. In some instances, NGS reads may be aligned to a known reference sequence (e.g., a wild-type sequence). In some instances, NGS reads may be assembled de novo. Methods of sequence alignment for NGS reads are described in, e.g., Trapnell, C. and Salzberg, S. L. *Nature Biotech.,* 2009, 27:455-457. Examples of de novo sequence assemblies are described in, e.g., Warren R., et al., *Bioinformatics,* 2007, 23:500-501; Butler, J. et al., *Genome Res.,* 2008, 18:810-820; and Zerbino, D. R. and Birney, E., *Genome Res.,* 2008, 18:821-829. Optimization of sequence alignment is described in the art, e.g., as set out in International Patent Application Publication No. WO 2012/092426. Additional description of sequence alignment methods is provided in, e.g., International Patent Application Publication No. WO 2020/236941, the entire content of which is incorporated herein by reference.

Misalignment (e.g., the placement of base-pairs from a short read at incorrect locations in the genome), e.g., misalignment of reads due to sequence context (e.g., the presence of repetitive sequence) around an actual cancer mutation can lead to reduction in sensitivity of mutation detection, can lead to a reduction in sensitivity of mutation detection, as reads for the alternate allele may be shifted off the histogram peak of alternate allele reads. Other examples of sequence context that may cause misalignment include short-tandem repeats, interspersed repeats, low complexity regions, insertions—deletions (indels), and paralogs. If the problematic sequence context occurs where no actual mutation is present, misalignment may introduce artifactual reads of "mutated" alleles by placing reads of actual reference genome base sequences at the wrong location. Because mutation-calling algorithms for multigene analysis should be sensitive to even low-abundance mutations, sequence misalignments may increase false positive discovery rates and/or reduce specificity.

In some instances, the methods and systems disclosed herein may integrate the use of multiple, individually-tuned, alignment methods or algorithms to optimize base-calling performance in sequencing methods, particularly in methods that rely on massively parallel sequencing of a large number of diverse genetic events at a large number of diverse genomic loci. In some instances, the disclosed methods and systems may comprise the use of one or more global alignment algorithms. In some instances, the disclosed methods and systems may comprise the use of one or more local alignment algorithms. Examples of alignment algorithms that may be used include, but are not limited to, the Burrows-Wheeler Alignment (BWA) software bundle (see, e.g., Li, et al. (2009), "Fast and Accurate Short Read Alignment with Burrows-Wheeler Transform", Bioinformatics 25:1754-60; Li, et al. (2010), Fast and Accurate Long-Read Alignment with Burrows-Wheeler Transform", Bioinformatics epub. PMID: 20080505), the Smith-Waterman algorithm (see, e.g., Smith, et al. (1981), "Identification of Common Molecular Subsequences", J. Molecular Biology 147(1):195-197), the Striped Smith-Waterman algorithm (see, e.g., Farrar (2007), "Striped Smith—Waterman Speeds Database Searches Six Times Over Other SIMD Implementations", Bioinformatics 23(2):156-161), the Needleman-Wunsch algorithm (Needleman, et al. (1970) "A General Method Applicable to the Search for Similarities in the Amino Acid Sequence of Two Proteins", J. Molecular Biology 48(3):443-53), or any combination thereof.

In some instances, the methods and systems disclosed herein may also comprise the use of a sequence assembly algorithm, e.g., the Arachne sequence assembly algorithm (see, e.g., Batzoglou, et al. (2002), "ARACHNE: A Whole-Genome Shotgun Assembler", Genome Res. 12:177-189).

In some instances, the alignment method used to analyze sequence reads is not individually customized or tuned for detection of different variants (e.g., point mutations, insertions, deletions, and the like) at different genomic loci. In some instances, different alignment methods are used to analyze reads that are individually customized or tuned for detection of at least a subset of the different variants detected at different genomic loci. In some instances, different alignment methods are used to analyze reads that are individually customized or tuned to detect each different variant at different genomic loci. In some instances, tuning can be a function of one or more of: (i) the genetic locus (e.g., gene loci, microsatellite locus, or other subject interval) being sequenced, (ii) the tumor type associated with the sample, (iii) the variant being sequenced, or (iv) a characteristic of the sample or the subject. The selection or use of alignment conditions that are individually tuned to a number of specific subject intervals to be sequenced allows optimization of speed, sensitivity, and specificity. The method is particularly effective when the alignment of reads for a relatively large number of diverse subject intervals are optimized. In some instances, the method includes the use of an alignment method optimized for rearrangements in combination with other alignment methods optimized for subject intervals not associated with rearrangements.

In some instances, the methods disclosed herein further comprise selecting or using an alignment method for analyzing, e.g., aligning, a sequence read, wherein said alignment method is a function of, is selected responsive to, or is optimized for, one or more of: (i) tumor type, e.g., the tumor type in the sample; (ii) the location (e.g., a gene locus) of the subject interval being sequenced; (iii) the type of variant (e.g., a point mutation, insertion, deletion, substitution, copy number variation (CNV), rearrangement, or fusion) in the subject interval being sequenced; (iv) the site (e.g., nucleotide position) being analyzed; (v) the type of sample (e.g., a sample described herein); and/or (vi) adjacent sequence(s) in or near the subject interval being evaluated (e.g., according to the expected propensity thereof for misalignment of the subject interval due to, e.g., the presence of repeated sequences in or near the subject interval).

In some instances, the methods disclosed herein allow for the rapid and efficient alignment of troublesome reads, e.g., a read having a rearrangement. Thus, in some instances where a read for a subject interval comprises a nucleotide position with a rearrangement, e.g., a translocation, the method can comprise using an alignment method that is appropriately tuned and that includes: (i) selecting a rearrangement reference sequence for alignment with a read, wherein said rearrangement reference sequence aligns with a rearrangement (in some instances, the reference sequence is not identical to the genomic rearrangement); and (ii) comparing, e.g., aligning, a read with said rearrangement reference sequence.

In some instances, alternative methods may be used to align troublesome reads. These methods are particularly effective when the alignment of reads for a relatively large number of diverse subject intervals is optimized. By way of example, a method of analyzing a sample can comprise: (i) performing a comparison (e.g., an alignment comparison) of a read using a first set of parameters (e.g., using a first mapping algorithm, or by comparison with a first reference sequence), and determining if said read meets a first alignment criterion (e.g., the read can be aligned with said first reference sequence, e.g., with less than a specific number of mismatches); (ii) if said read fails to meet the first alignment criterion, performing a second alignment comparison using a second set of parameters, (e.g., using a second mapping algorithm, or by comparison with a second reference sequence); and (iii) optionally, determining if said read meets said second criterion (e.g., the read can be aligned with said second reference sequence, e.g., with less than a specific number of mismatches), wherein said second set of parameters comprises use of, e.g., said second reference sequence, which, compared with said first set of parameters, is more likely to result in an alignment with a read for a variant (e.g., a rearrangement, insertion, deletion, or translocation).

In some instances, the alignment of sequence reads in the disclosed methods may be combined with a mutation calling method as described elsewhere herein. As discussed herein, reduced sensitivity for detecting actual mutations may be addressed by evaluating the quality of alignments (manually or in an automated fashion) around expected mutation sites in the genes or genomic loci (e.g., gene loci) being analyzed. In some instances, the sites to be evaluated can be obtained from databases of the human genome (e.g., the HG19 human reference genome) or cancer mutations (e.g., COSMIC). Regions that are identified as problematic can be remedied with the use of an algorithm selected to give better performance in the relevant sequence context, e.g., by alignment optimization (or re-alignment) using slower, but more accurate alignment algorithms such as Smith-Waterman alignment. In cases where general alignment algorithms cannot remedy the problem, customized alignment approaches may be created by, e.g., adjustment of maximum difference mismatch penalty parameters for genes with a high likelihood of containing substitutions; adjusting specific mismatch penalty parameters based on specific mutation types that are common in certain tumor types (e.g. C→T in melanoma); or adjusting specific mismatch penalty parameters based on specific mutation types that are common in certain sample types (e.g. substitutions that are common in FFPE).

Reduced specificity (increased false positive rate) in the evaluated subject intervals due to misalignment can be assessed by manual or automated examination of all mutation calls in the sequencing data. Those regions found to be prone to spurious mutation calls due to misalignment can be subjected to alignment remedies as discussed above. In cases where no algorithmic remedy is found possible, "mutations" from the problem regions can be classified or screened out from the panel of targeted loci.

Base calling refers to the raw output of a sequencing device, e.g., the determined sequence of nucleotides in an oligonucleotide molecule. Mutation calling refers to the process of selecting a nucleotide value, e.g., A, G, T, or C, for a given nucleotide position being sequenced. Typically, the sequence reads (or base calling) for a position will provide more than one value, e.g., some reads will indicate a T and some will indicate a G. Mutation calling is the process of assigning a correct nucleotide value, e.g., one of those values, to the sequence. Although it is referred to as "mutation" calling, it can be applied to assign a nucleotide value to any nucleotide position, e.g., positions corresponding to mutant alleles, wild-type alleles, alleles that have not been characterized as either mutant or wild-type, or to positions not characterized by variability.

In some instances, the disclosed methods may comprise the use of customized or tuned mutation calling algorithms or parameters thereof to optimize performance when applied to sequencing data, particularly in methods that rely on massively parallel sequencing of a large number of diverse genetic events at a large number of diverse genomic loci (e.g., gene loci, microsatellite regions, etc.) in samples, e.g., samples from a subject having cancer. Optimization of mutation calling is described in the art, e.g., as set out in International Patent Application Publication No. WO 2012/092426.

Methods for mutation calling can include one or more of the following: making independent calls based on the information at each position in the reference sequence (e.g., examining the sequence reads; examining the base calls and quality scores; calculating the probability of observed bases and quality scores given a potential genotype; and assigning genotypes (e.g., using Bayes' rule)); removing false positives (e.g., using depth thresholds to reject SNPs with read depth much lower or higher than expected; local realignment to remove false positives due to small indels); and performing linkage disequilibrium (LD)/imputation-based analysis to refine the calls.

Equations used to calculate the genotype likelihood associated with a specific genotype and position are described in, e.g., Li, H. and Durbin, R. *Bioinformatics*, 2010; 26(5): 589-95. The prior expectation for a particular mutation in a certain cancer type can be used when evaluating samples from that cancer type. Such likelihood can be derived from public databases of cancer mutations, e.g., Catalogue of Somatic Mutation in Cancer (COSMIC), HGMD (Human Gene Mutation Database), The SNP Consortium, Breast Cancer Mutation Data Base (BIC), and Breast Cancer Gene Database (BCGD).

Examples of LD/imputation based analysis are described in, e.g., Browning, B. L. and Yu, Z. *Am. J. Hum. Genet.* 2009, 85(6):847-61. Examples of low-coverage SNP calling methods are described in, e.g., Li, Y., et al., *Annu. Rev. Genomics Hum. Genet.* 2009, 10:387-406.

After alignment, detection of substitutions can be performed using a mutation calling method (e.g., a Bayesian mutation calling method) which is applied to each base in each of the subject intervals, e.g., exons of a gene or other locus to be evaluated, where presence of alternate alleles is observed. This method will compare the probability of observing the read data in the presence of a mutation with the probability of observing the read data in the presence of base-calling error alone. Mutations can be called if this comparison is sufficiently strongly supportive of the presence of a mutation.

An advantage of a Bayesian mutation-detection approach is that the comparison of the probability of the presence of a mutation with the probability of base-calling error alone can be weighted by a prior expectation of the presence of a mutation at the site. If some reads of an alternate allele are observed at a frequently mutated site for the given cancer type, then presence of a mutation may be confidently called even if the amount of evidence of mutation does not meet the usual thresholds. This flexibility can then be used to increase detection sensitivity for even rarer mutations/lower purity samples, or to make the test more robust to decreases in read coverage. The likelihood of a random base-pair in the genome being mutated in cancer is ~1e-6. The likelihood of specific mutations occurring at many sites in, for example, a typical multigenic cancer genome panel can be orders of magnitude higher. These likelihoods can be derived from public databases of cancer mutations (e.g., COSMIC).

Indel calling is a process of finding bases in the sequencing data that differ from the reference sequence by insertion or deletion, typically including an associated confidence score or statistical evidence metric. Methods of indel calling can include the steps of identifying candidate indels, calculating genotype likelihood through local re-alignment, and performing LD-based genotype inference and calling. Typically, a Bayesian approach is used to obtain potential indel candidates, and then these candidates are tested together with the reference sequence in a Bayesian framework.

Algorithms to generate candidate indels are described in, e.g., McKenna, A., et al., *Genome Res.* 2010; 20(9):1297-303; Ye, K., et al., *Bioinformatics,* 2009; 25(21):2865-71; Lunter, G., and Goodson, M., *Genome Res.* 2011; 21(6): 936-9; and Li, H., et al. (2009), *Bioinformatics* 25(16):2078-9.

Methods for generating indel calls and individual-level genotype likelihoods include, e.g., the Dindel algorithm (Albers, C. A., et al., *Genome Res.* 2011; 21(6):961-73). For example, the Bayesian EM algorithm can be used to analyze the reads, make initial indel calls, and generate genotype likelihoods for each candidate indel, followed by imputation of genotypes using, e.g., QCALL (Le S. Q. and Durbin R. *Genome Res.* 2011; 21(6):952-60). Parameters, such as prior expectations of observing the indel can be adjusted (e.g., increased or decreased), based on the size or location of the indels.

Methods have been developed that address limited deviations from allele frequencies of 50% or 100% for the analysis of cancer DNA. (see, e.g., SNVMix—Bioinformatics. 2010 Mar. 15; 26(6): 730-736.) Methods disclosed herein, however, allow consideration of the possibility of the presence of a mutant allele at frequencies (or allele fractions) ranging from 1% to 100% (i.e., allele fractions ranging from 0.01 to 1.0), and especially at levels lower than 50%. This approach is particularly important for the detection of mutations in, for example, low-purity FFPE samples of natural (multi-clonal) tumor DNA.

In some instances, the mutation calling method used to analyze sequence reads is not individually customized or fine-tuned for detection of different mutations at different genomic loci. In some instances, different mutation calling methods are used that are individually customized or fine-tuned for at least a subset of the different mutations detected at different genomic loci. In some instances, different mutation calling methods are used that are individually customized or fine-tuned for each different mutant detected at each different genomic loci. The customization or tuning can be based on one or more of the factors described herein, e.g., the type of cancer in a sample, the gene or locus in which the subject interval to be sequenced is located, or the variant to be sequenced. This selection or use of mutation calling methods individually customized or fine-tuned for a number of subject intervals to be sequenced allows for optimization of speed, sensitivity and specificity of mutation calling.

In some instances, a nucleotide value is assigned for a nucleotide position in each of X unique subject intervals using a unique mutation calling method, and X is at least 2, at least 3, at least 4, at least 5, at least 10, at least 15, at least 20, at least 30, at least 40, at least 50, at least 60, at least 70, at least 80, at least 90, at least 100, at least 200, at least 300, at least 400, at least 500, at least 1000, at least 1500, at least 2000, at least 2500, at least 3000, at least 3500, at least 4000, at least 4500, at least 5000, or greater. The calling methods can differ, and thereby be unique, e.g., by relying on different Bayesian prior values.

In some instances, assigning said nucleotide value is a function of a value which is or represents the prior (e.g., literature) expectation of observing a read showing a variant, e.g., a mutation, at said nucleotide position in a tumor of type.

In some instances, the method comprises assigning a nucleotide value (e.g., calling a mutation) for at least 10, 20, 40, 50, 60, 70, 80, 90, 100, 200, 300, 400, 500, 600, 700, 800, 900, or 1,000 nucleotide positions, wherein each assignment is a function of a unique value (as opposed to the value for the other assignments) which is or represents the prior (e.g., literature) expectation of observing a read showing a variant, e.g., a mutation, at said nucleotide position in a tumor of type.

In some instances, assigning said nucleotide value is a function of a set of values which represent the probabilities of observing a read showing said variant at said nucleotide position if the variant is present in the sample at a specified frequency (e.g., 1%, 5%, 10%, etc.) and/or if the variant is absent (e.g., observed in the reads due to base-calling error alone).

In some instances, the mutation calling methods described herein can include the following: (a) acquiring, for a nucleotide position in each of said X subject intervals: (i) a first value which is or represents the prior (e.g., literature) expectation of observing a read showing a variant, e.g., a mutation, at said nucleotide position in a tumor of type X; and (ii) a second set of values which represent the probabilities of observing a read showing said variant at said nucleotide position if the variant is present in the sample at a frequency (e.g., 1%, 5%, 10%, etc.) and/or if the variant is absent (e.g., observed in the reads due to base-calling error alone); and (b) responsive to said values, assigning a nucleotide value (e.g., calling a mutation) from said reads for each of said nucleotide positions by weighing, e.g., by a Bayesian method described herein, the comparison among the values in the second set using the first value (e.g., computing the posterior probability of the presence of a mutation), thereby analyzing said sample.

Additional description of mutation calling methods is provided in, e.g., International Patent Application Publication No. WO 2020/236941, the entire content of which is incorporated herein by reference.

In some instances, one or more sequence reads may be used to generate a genomic profile for the subject, which may further include additional data (i.e., in addition to the data generated from sequence reads). In some instances, a genomic profile may comprise information on the presence of genes (or variant sequences thereof), copy number variations, epigenetic traits, proteins (or modifications thereof), and/or other biomarkers in an individual's genome and/or proteome, as well as information on the individual's corresponding phenotypic traits and the interaction between genetic or genomic traits, phenotypic traits, and environmental factors. The genomic profile for the subject may include the results (e.g., sequence read analysis data) of an analysis of the one or more sequence reads using a comprehensive genomic profiling (CGP) test, a gene expression profiling test, a cancer hotspot panel test, a DNA methylation test, a DNA fragmentation test, an RNA fragmentation test, or any combination thereof. Other data indicating the genomic profile of the subject may be included in the genomic profile. The genomic profile may further include information classifying a subject and/or identifying one or more treatments to be used on the subject based on the analysis data of the sequence reads. The genomic profile may be updated to include classifying and/or treatment information after further processing of the data is performed, e.g., based on modeling of the data, as described herein.

Computer Systems and Methods

The methods described herein may be implemented using one or more computer systems. Such computer systems can include one or more programs configured to execute one or more processors for the computer system to perform such methods. One or more steps of the computer-implemented methods may be performed automatically.

In some instances, the disclosed systems may further comprise a sequencer, e.g., a next generation sequencer (also referred to as a massively parallel sequencer). Examples of next generation (or massively parallel) sequencing platforms include, but are not limited to, the Roche 454, Illumina Solexa, ABI-SOLiD, ION Torrent, or Pacific Bioscience sequencing platforms.

Figure 5A:
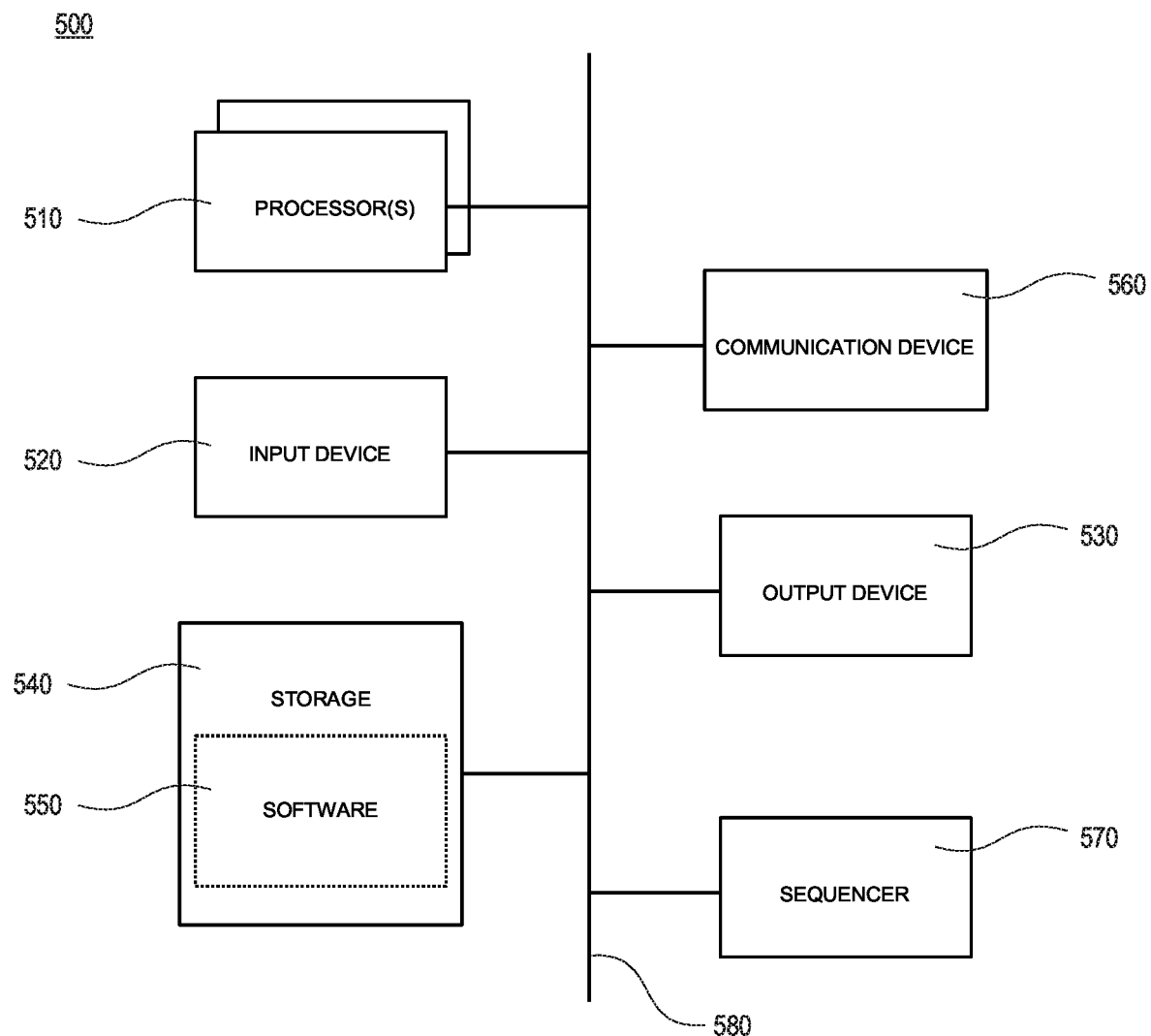
FIG. 5A shows an example of a computing device in accordance with some embodiments.

FIG. 5A shows an example of a computing device in accordance with one embodiment. Device 500 can be a host computer connected to a network. Device 500 can be a client computer or a server. As shown in FIG. 5, device 500 can be any suitable type of microprocessor-based device, such as a personal computer, workstation, server or handheld computing device (portable electronic device) such as a phone or tablet. The device can include, for example, one or more of processors 510, input device 520, output device 530, storage 540, and communication device 560. Input device 520 and output device 530 can generally correspond to those described above, and can either be connectable or integrated with the computer.

Input device 520 can be any suitable device that provides input, such as a touch screen, keyboard or keypad, mouse, or voice-recognition device. Output device 530 can be any suitable device that provides output, such as a touch screen, haptics device, or speaker. In some embodiments, the input and output device 520/530 can be the same or different devices.

Storage 540 can be any suitable device that provides storage, such as an electrical, magnetic or optical memory including a RAM (volatile and non-volatile), cache, hard drive, or removable storage disk. Communication device 560 can include any suitable device capable of transmitting and receiving signals over a network, such as a network interface chip or device. The components of the computer can be connected in any suitable manner, such as via a physical bus 580 or wirelessly (e.g., Bluetooth®, Wi-Fi®, or any other wireless technology).

Software 550, which can be stored in storage 540 and executed by processor 510, can include, for example, the programming that embodies the functionality of the present disclosure (e.g., as embodied in the devices as described above).

Software 550 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 500 can implement any operating system suitable for operating on the network. Software 550 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example. In some embodiments, the operating system is executed by one or more processors, e.g., processor(s) 510.

Device 500 can further include a sequencer 570, which can be any suitable nucleic acid sequencing instrument.

Figure 5B:
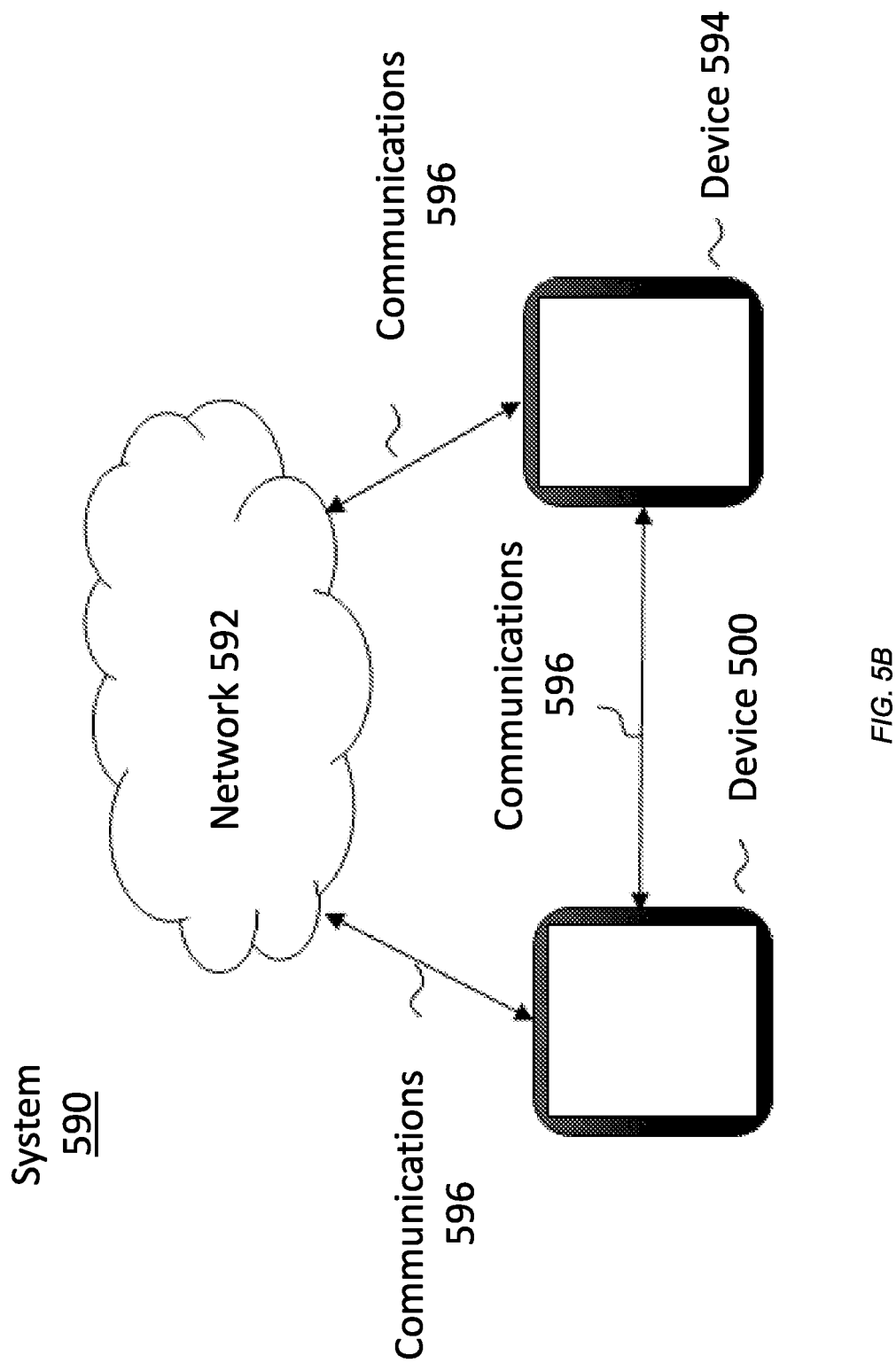
FIG. 5B shows an example of shows an example of a computing system in accordance with one embodiment.

FIG. 5B shows an example of a computing system in accordance with one embodiment. In computing system 590, device 500 (e.g., as described above and illustrated in FIG. 5A) is connected to network 592, which is also connected to device 594. In some embodiments, device 594 is a sequencer (e.g., a next-generation sequencer). Exemplary sequencers can include, without limitation, Roche/454's Genome Sequencer (GS) FLX System, Illumina/Solexa's Genome Analyzer (GA), Illumina's HiSeq 2500, HiSeq 3000, HiSeq 4000 and NovaSeq 6000 Sequencing Systems, Life/APL's Support Oligonucleotide Ligation Detection (SOLiD) system, Polonator's G.007 system, Helicos BioSciences' HeliScope Gene Sequencing system, or Pacific Biosciences' PacBio RS system.

Devices 500 and 594 may communicate, e.g., using suitable communication interfaces via network 592, such as a Local Area Network (LAN), Virtual Private Network (VPN), or the Internet. In some embodiments, network 592 can be, for example, the Internet, an intranet, a virtual private network, a cloud network, a wired network, or a wireless network. Devices 500 and 594 may communicate, in part or in whole, via wireless or hardwired communications, such as Ethernet, IEEE 802.11b wireless, or the like. Additionally, devices 500 and 594 may communicate, e.g., using suitable communication interfaces, via a second network, such as a mobile/cellular network. Communication between devices 500 and 594 may further include or communicate with various servers such as a mail server, mobile server, media server, telephone server, and the like. In some embodiments, Devices 500 and 594 can communicate directly (instead of, or in addition to, communicating via network 592), e.g., via wireless or hardwired communications, such as Ethernet, IEEE 802.11b wireless, or the like. In some embodiments, devices 500 and 594 communicate via communications 596, which can be a direct connection or can occur via a network (e.g., network 592).

One or all of devices 500 and 594 generally include logic (e.g., http web server logic) or are programmed to format data, accessed from local or remote databases or other sources of data and content, for providing and/or receiving information via network 592 according to various examples described herein.

By way of example, a system (e.g., an electronic device) includes one or more processors; and a non-transitory, computer-readable memory storing one or more programs configured to be executed by the one or more processors the one or more programs including instructions for implementing the method of determining an expected treatment outcome for a subject having a disease. The one or more programs, when executed by the one or more processors, cause the one or more processors to receive a plurality of subject characteristics for the subject; access a tree-based model (which may be stored, for example, in the non-transitory computer readable memory) corresponding to a treatment option for the disease, wherein the tree-based model is generated based on a plurality of prior patient characteristics and an associated treatment outcome for the corresponding treatment option; and determine from the plurality of subject characteristics and the tree-based model, an expected treatment outcome for the subject if the subject were treated with the corresponding treatment option. In some instances, the one or more programs, when executed by the one or more processors, further causes the one or more processors to generate the tree-based model.

A non-transitory computer-readable storage medium can store one or more programs, the one or more programs comprising instructions, which when executed by one or more processors of a system, cause the system to perform a method of determining an expected treatment outcome for a subject having a disease, as described herein. The one or more programs, when executed by the one or more processors, cause the one or more processors to receive a plurality of subject characteristics for the subject; access a tree-based model (which may be stored, for example, in the non-transitory computer readable memory) corresponding to a treatment option for the disease, wherein the tree-based model is generated based on a plurality of prior patient characteristics and an associated treatment outcome for the corresponding treatment option; and determine from the plurality of subject characteristics and the tree-based model, an expected treatment outcome for the subject if the subject were treated with the corresponding treatment option. In some instances, the one or more programs, when executed by the one or more processors, further causes the one or more processors to generate the tree-based model.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A method of determining an expected treatment outcome for a subject having a disease comprising:
   providing a plurality of nucleic acid molecules obtained from a sample from the subject having the disease;
   ligating one or more adapters onto one or more nucleic acid molecules from the plurality of nucleic acid molecules;
   amplifying the one or more ligated nucleic acid molecules from the plurality of nucleic acid molecules;
   capturing amplified nucleic acid molecules from the amplified nucleic acid molecules;
   sequencing, by a sequencer, the captured nucleic acid molecules to obtain a plurality of sequence reads that represent the captured nucleic acid molecules;
   generating, by one or more processors, a genomic profile including sequence read analysis data based on the sequence reads;
   identifying, using the one or more processors, a subject characteristic comprising a biomarker value for one or more gene loci based on the sequence read analysis data;
   receiving, at one or more processors, a plurality of additional subject characteristics for the subject;
   accessing, using the one or more processors, a tree-based model corresponding to a treatment option for the disease, wherein the tree-based model is trained based on a plurality of prior patient characteristics and an associated treatment outcome for the corresponding treatment option; and
   determining, using the one or more processors, from the plurality of subject characteristics and the tree-based model, an expected treatment outcome for the subject provided that the subject is treated with the corresponding treatment option, wherein determining the expected treatment outcome comprises weighting a plurality of nodes in each tree-based model based on the plurality of subject characteristics and the plurality of prior patient characteristics.

2. A method of determining an expected treatment outcome for a subject having a disease, comprising:
   receiving, at one or more processors, a plurality of subject characteristics for the subject;
   accessing, using the one or more processors, a tree-based model corresponding to a treatment option for the disease, wherein the tree-based model is trained based on a plurality of prior patient characteristics and an associated treatment outcome for the corresponding treatment option; and determining, using the one or more processors, from the plurality of subject characteristics and the tree-based model, an expected treatment outcome for the subject provided that the subject is treated with the corresponding treatment option, wherein determining the expected treatment outcome comprises weighting a plurality of nodes in each tree-based model based on the plurality of subject characteristics and the plurality of prior patient characteristics.

3. A method of determining an expected treatment outcome for a subject having a disease, comprising:

receiving, at one or more processors, a plurality of subject characteristics for the subject;

accessing, using the one or more processors, two or more tree-based models, wherein each tree-based model corresponds to a treatment option for the disease, and wherein each tree-based model is trained based on a plurality of prior patient characteristics and an associated treatment outcome for the corresponding treatment option; and determining, using the one or more processors, from the plurality of subject characteristics and the two or more tree-based models, an expected treatment outcome for the subject provided that the subject is treated with the corresponding treatment option, wherein determining the expected treatment outcome comprises weighting a plurality of nodes in each tree-based model based on the plurality of subject characteristics and the plurality of prior patient characteristics.

4. A method of selecting a treatment for a subject having a disease, comprising:

determining an expected treatment outcome for the subject for two or more treatment options according to the method of claim 3; and selecting, based on the expected treatment outcome of each treatment option, the treatment option most likely to be effective for treating the disease in the subject.

5. A method for treating a subject having a disease, comprising:

determining an expected treatment outcome for the subject for two or more treatment options according to the method of claim 3;

selecting, based on the expected treatment outcome of each treatment option, the treatment option most likely to be effective for treating the disease in the subject; and administering the selected treatment option to the subject.

6. The method of claim 5, wherein each tree-based model is a tree-based regression model, an ensemble tree model, or a Bayesian additive regression tree model.

7. The method of claim 5, wherein uncertainty in the tree-based models is accounted for using a Markov chain Monte Carlo process, a bagging processes, or a non-Bayesian model.

8. The method of claim 5, wherein the tree-based model is populated, at least in part, based on a draw from a prior predictive distribution.

9. The method of claim 5, wherein the tree-based model is populated, at least in part, using a predetermined or data-informed prior distribution.

10. The method of claim 5, wherein the tree-based model is pruned to generate a coarser partition of covariate space.

11. The method of claim 5, wherein determining the expected treatment outcome comprises omitting one or more trees from the tree-based model if the one or more trees fail to provide a treatment outcome prediction.

12. The method of claim 5, wherein the treatment option comprises an immune-oncology treatment option or a chemotherapy treatment option, or both.

13. The method of claim 5, further comprising comparing expected treatment outcomes for two or more different treatment options.

14. The method of claim 5, wherein the treatment outcomes for at least a first portion of the plurality of prior patients were determined during one or more clinical trials.

15. The method of claim 5, wherein the treatment outcomes for at least a second portion of the plurality of prior patients were determined outside of a clinical trial.

16. The method of claim 5, wherein the treatment outcome and the expected treatment outcome is for an overall survival time, a progression free survival time, a tumor response, a change in ctDNA level in the subject, disease remission, or a resistance to treatment.

17. The method of claim 5, wherein the expected treatment outcome is a distribution of expected treatment outcome likelihoods.

18. The method of claim 17, wherein the expected treatment outcome is a distribution of expected treatment outcome likelihoods for a plurality of time periods.

19. The method of claim 5, wherein:

the plurality of subject characteristics comprises one or more of age, sex, race, year of cancer diagnosis, time since cancer diagnosis, time since diagnosis of metastatic disease, a biomarker value, a comorbidity, a list of prior therapies, a baseline ctDNA value, a practice setting, or a performance status;

the plurality of prior patient characteristics comprises one or more of age, sex, race, year of cancer diagnosis, time since cancer diagnosis, time since diagnosis of metastatic disease, a biomarker value, a comorbidity, a list of prior therapies, a baseline ctDNA value, a practice setting, or a performance status; and at least a portion of the plurality of subject characteristics are the same type of characteristics as at least a portion of the plurality of prior patient characteristics for at least a portion of the prior patients.

* * * * *